United States Patent
Villar et al.

(10) Patent No.: US 10,912,327 B2
(45) Date of Patent: Feb. 9, 2021

(54) DROPLET ASSEMBLIES AND METHODS FOR PRODUCING DROPLET ASSEMBLIES

(71) Applicant: DOVETAILED LIMITED, Cambridge (GB)

(72) Inventors: Gabriel Villar, Norfolk (GB); Vaiva Kalnikaite, Cambridge (GB)

(73) Assignee: DOVETAILED LIMITED, Cambridge (GB)

( * ) Notice: Subject to any disclaimer, the term of this patent is extended or adjusted under 35 U.S.C. 154(b) by 0 days.

(21) Appl. No.: 15/557,482

(22) PCT Filed: May 22, 2015

(86) PCT No.: PCT/GB2015/051520
§ 371 (c)(1),
(2) Date: Sep. 12, 2017

(87) PCT Pub. No.: WO2016/142637
PCT Pub. Date: Sep. 15, 2016

(65) Prior Publication Data
US 2018/0055084 A1    Mar. 1, 2018

(30) Foreign Application Priority Data

Mar. 12, 2015 (GB) .................... 1504222.9

(51) Int. Cl.
| | | |
|---|---|---|
| *A23P 10/30* | (2016.01) | |
| *B01J 13/04* | (2006.01) | |
| *B01J 13/02* | (2006.01) | |
| *B01J 13/08* | (2006.01) | |
| *B01J 13/10* | (2006.01) | |
| *B01J 13/14* | (2006.01) | |
| *A47J 27/10* | (2006.01) | |
| *A47J 36/24* | (2006.01) | |
| *A47J 27/00* | (2006.01) | |

(52) U.S. Cl.
CPC ............. *A23P 10/30* (2016.08); *B01J 13/02* (2013.01); *B01J 13/04* (2013.01); *B01J 13/08* (2013.01); *B01J 13/10* (2013.01); *B01J 13/14* (2013.01); *A47J 27/004* (2013.01); *A47J 27/10* (2013.01); *A47J 36/2483* (2013.01)

(58) Field of Classification Search
CPC .. A23P 10/30; B01J 13/02; B01J 13/04; B01J 13/08; B01J 13/10; B01J 13/14; A47J 27/004; A47J 27/10; A47J 36/2483
See application file for complete search history.

(56) References Cited

U.S. PATENT DOCUMENTS

| | | | |
|---|---|---|---|
| 6,106,875 A | 8/2000 | Soper et al. | |
| 2013/0045319 A1* | 2/2013 | Castro Forns | A23L 2/54 426/592 |
| 2013/0251862 A1 | 9/2013 | Short et al. | |

FOREIGN PATENT DOCUMENTS

| | | |
|---|---|---|
| JP | 2012011269 A | 1/2012 |
| WO | WO2007/012981 A2 | 2/2017 |

OTHER PUBLICATIONS https://www.starchefs.com/events/studio/techniques/JAndres, StarChef Studio, Nov. 2007.*
Anonymous: "3ders.org—Cambridge design studio Dovetailed invented a 3D fruit printer 1 3D Printer News & 3D Printing News",Retrieved from the Internet: URL:http://www.3ders.org/articles/20140524.
https://vimeo.com/96510739 "Dovetailed 3d Fruit Printer".
International Search Report and Written Opinion dated Oct. 21, 2015.

* cited by examiner

*Primary Examiner* — Irina S Zemel
(74) *Attorney, Agent, or Firm* — Fresh IP PLC; Clifford D. Hyra; Aubrey Y Chen

(57) ABSTRACT

Provided is a method for preparing an assembly of integrated capsules, the method comprising the steps of: (i) providing a first body comprising a body reagent, wherein the body reagent is, or is contained within, a body medium; (ii) contacting the first body with a bulk medium comprising a bulk reagent, and permitting a first capsule shell to form at the boundary between the body medium and the bulk medium, thereby providing a first capsule, wherein the shell comprises a product of a reaction involving the body reagent and the bulk reagent; (iii) providing a second body comprising a body reagent, wherein the body reagent is, or is contained within, a body medium; (iv) contacting the second body with a bulk medium comprising a bulk reagent, and permitting a second capsule shell to form at the boundary between the second body medium and the bulk medium, thereby providing a second capsule, wherein the shell comprises a product of a reaction involving the body reagent and the bulk reagent; and (v) permitting the first and second capsule shells to integrate, thereby forming an assembly of first and second bodies. An assembly obtained or obtainable by the method is also provided.

19 Claims, 17 Drawing Sheets

(a)

(b)

DROPLET ASSEMBLIES AND METHODS FOR PRODUCING DROPLET ASSEMBLIES

RELATED APPLICATION

The present claims the benefit and priority of GB 1504222.9 filed on 12 Mar. 2015 (13 Mar. 2015), the contents of which are hereby incorporated by reference in their entirety.

TECHNICAL FIELD

The invention relates to assemblies of bodies, in particular assemblies of droplets, and methods for producing these assemblies.

BACKGROUND ART

It is known to produce an assembly of droplets in a 3D printing method. WO 2014/087175 describes an apparatus for producing a droplet assembly. Each droplet in the assembly consists of an aqueous medium and is dispensed into a hydrophobic medium. The self-assembly of amphipathic molecules around each droplet at the interface between the droplet medium and the bulk medium creates a monolayer which stabilises the droplet. When two droplets come into contact their monolayers adhere to form a bilayer at an interface between them. The result is an assembly of a plurality of aqueous droplets within a hydrophobic medium, stabilised by amphipathic molecules at interfaces between droplets and between a droplet and the bulk medium.

WO 2014/087175 also describes the same concept in reverse, the droplet medium being hydrophobic and the bulk medium being aqueous.

In addition, a process is described wherein an assembly of aqueous droplets is produced within a hydrophobic medium, and the hydrophobic medium is itself a drop suspended in an aqueous medium. The hydrophobic drop is stabilised by a monolayer of amphipathic molecules and each aqueous droplet within the drop is stabilised by a monolayer of amphipathic molecules. These so-called "multisome" assemblies are also described in WO 2013/064837.

In WO 2014/087175 the apparatus used to produce the droplet assembly includes a droplet generator, a container moveable relative to the generator and a control unit adapted to control the dispensing of droplets from the generator and the movement of the container relative to the generator. Additional droplet generators may also be present in the apparatus.

Thus it can be seen that attempts have been made to form a stable assembly of droplets by 3D printing. Such assemblies can be useful in a range of applications, for example when used as a drug-delivery vehicle. Other uses also recognised in WO 2014/087175 include tissue engineering, synthetic biology, materials science and engineering, and use as a template for the patterning of a solid material. However, other useful applications exist for droplet assemblies which have not previously been recognised. This is because known droplet assemblies such as those described in WO 2014/087175 lack the properties required for utility in a more diverse range of applications.

For example, the usefulness of the assemblies in WO 2014/087175 is limited because the assembly would typically disintegrate when removed from the bulk medium, due to the relative instability of the amphipathic layers. This is especially true for droplets of larger diameter. Thus, an assembly of aqueous droplets is confined to the hydrophobic medium in which it is created. Moreover, it is very difficult to tailor the properties of the complete assembly because this ultimately depends upon the nature of the self-assembled amphipathic layers. The amphipathic layers are limited in thickness, stability, chemical composition and in other properties, and these constraints in turn limit the shape, size, stability, chemical composition and other properties of the droplets. For example, the droplets must be very small in order for the amphipathic bilayers to be stable, which again limits the usefulness of the assembly.

Therefore, there is a need for more stable assemblies suitable for use in a wider range of applications than previously possible with known droplet assemblies.

SUMMARY OF THE INVENTION

The inventors have found that an assembly of capsules may be readily prepared by integrating the shells of capsules formed from the reaction of a reagent held in a body medium with a reagent that is provided in a bulk medium, with which the body medium is contacted.

The present invention has been devised in order to address at least one of the above problems. Preferably, the present invention reduces, ameliorates, avoids or overcomes at least one of the above problems.

The assembly is fully self-supporting and durable. The size of the assembly and the size of the capsules within the assembly are controllable, and the assembly and the individual capsules may be prepared to a range of dimensions, and on a relatively large scale, as required.

According to a first aspect of the invention, there is provided a method for preparing an assembly comprising a plurality of integrated capsules, the method comprising the steps of:

(i) providing a first body comprising a body reagent, wherein the body reagent is, or is contained within, a body medium;

(ii) contacting the first body with a bulk medium comprising a bulk reagent, and permitting a first capsule shell to form at the boundary between the body medium and the bulk medium, thereby providing a first capsule, wherein the shell comprises a product of a reaction involving the body reagent and the bulk reagent, such as ionic cross-linking;

(iii) providing a second body comprising a body reagent, wherein the body reagent is, or is contained within, a body medium;

(iv) contacting the second body with a bulk medium comprising a bulk reagent, and permitting a second capsule shell to form at the boundary between the second body medium and the bulk medium, thereby providing a second capsule, wherein the shell comprises a product of a reaction involving the body reagent and the bulk reagent, such as ionic cross-linking; and (v) permitting the first and second capsule shells to integrate, thereby forming an assembly of first and second bodies.

In a further aspect of the invention there is provided a method for producing an assembly comprising a plurality of integrated capsules, the method comprising the steps of:

(i) providing a plurality of discrete media, wherein each medium is or comprises a first reagent;

(ii) contacting each medium with a bulk medium comprising a second reagent;

(iii) permitting a capsule shell to form at the boundary of each medium with the bulk medium, thereby providing a capsule, wherein the shell comprises a product of a reaction involving the body reagent and the bulk reagent, such as ionic cross-linking; and (iv) permitting a capsule shell of a discrete medium to integrate with the shell of at least one other discrete medium, thereby forming an assembly.

In some embodiments, the body reagent and bulk reagent are each reactants which are consumed in a reaction to form the capsule shell. In some embodiments the reaction occurs at the boundary of the body medium and proceeds as a reaction-diffusion process across a surface of the body.

In alternative embodiments, one of the body reagent and bulk reagent may be a catalyst which catalyses the conversion of the other reagent into the material which forms the capsule shell.

The reaction to form the capsule shell does not include the adsorption of an amphiphile at an aqueous-hydrophobic interface.

The reaction between the body reagent and bulk reagent may be a gelation reaction, such as the ionic cross-linking of polymer chains.

The first and second capsule shells are permitted to integrate, for example by placing the first and second bodies in close proximity so that the propagation of shell growth causes the shells to integrate to form an assembly. The capsule shell structure and the integration of shells of multiple bodies ensures that each individual body and the assembly as a whole is robust and resistant to isolation, further manipulation (for example immersion in further aqueous or hydrophobic media) and storage for relatively long periods of time without loss of structural integrity.

The shape and size of the individual bodies is not particularly limited and may be chosen based on the desired properties of the overall assembly. In some embodiments, the first and second bodies are discrete droplets. Alternatively, the bodies may be more continuous extended structures, for example filamentous structures formed by continuous extrusion of the body medium.

In some embodiments, the product of the reaction involving the body reagent and the bulk reagent is a gel, for example a hydrogel. Gels exhibit particularly desirable properties for the purposes of droplet assemblies of the present invention, and their use in droplet assemblies has not previously been thought possible.

The use of a gel provides a porous capsule shell to facilitate diffusion of the body reagent through the nascent shell during shell formation, which facilitates shell propagation and therefore integration of neighbouring shells.

However, the reaction product is not necessarily limited to gels, so long as the product is capable of complete encapsulation of the body medium to produce a stable capsule, and provided that the shell formation propagates outwards from the body to an extent which allows for integration of adjacent shells. Propagation of shell growth may be only in the outward direction, or may be both inwards and outwards. In some embodiments, the reaction product may be selected from solid precipitates of proteins (e.g. gelatine), solid synthetic polymers (e.g. nylon) or metal salts (e.g. calcium carbonate). The material selected will depend upon the intended use of the assembly after production. In preferred embodiments, the reaction product comprises a porous structure to facilitate the diffusion of the body reagent through the shell.

In some embodiments the body medium comprises the body reagent. For example, the reagent may be dissolved within the body medium. Alternatively, the body medium may comprise a suspension of the body reagent. In other embodiments, the body medium and the body reagent are the same, i.e. the body medium is the body reagent.

In some embodiments, the body medium may be distinct from the body reagent. For example, the reagent may reside on the surface of the body medium.

In some embodiments, the first and/or second body media are aqueous media. In this way, the assembly has increased biocompatibility and it is possible to more easily adapt the body media to contain a wide variety of additional useful ingredients.

In some embodiments, the bulk media are aqueous media. In preferred embodiments, the method requires the use of only aqueous media during body deposition and assembly formation. This is not possible in previous methods for producing a droplet assembly. Aqueous bulk media makes performance of the method straightforward and allows the composition of the bulk media to be adapted more effectively. Biocompatibility of the resultant assembly is also more easily provided.

Furthermore, in an amphiphile-stabilised assembly wherein the bulk medium is hydrophobic, the assembly contents will over time migrate into the bulk medium, eventually leading to destruction of the assembly. This problem is overcome by the present invention.

In some embodiments, the body media and bulk media are aqueous media. This has not previously been possible in processes for the production of droplet assemblies, which generally require the presence of immiscible media such that droplets of one medium may be suspended within a mass of the other medium.

In some embodiments, the first and second capsule shells are formed in a reverse-spherification process. In such a process, the first and second body media are dispensed into a bath containing the bulk medium.

In reverse-spherification the reaction-diffusion process to form the shell proceeds outwards from the boundary of the body, thereby preserving the volume of intact body medium. Although this is preferred, the formation of bodies by a process including a spherification reaction is also envisaged by the present invention. However in spherification the reaction-diffusion process will propagate inwardly from the boundary, consuming the body medium and reducing the volume of intact body medium retained in the assembly.

In some embodiments, both the first and second bodies are dispensed into a single bath holding the bulk medium. In this way, the assembly is immersed within the bath during formation. Since the bath contains a "reservoir" of bulk reagent, the structure and properties of the capsule shell can be tailored based on the concentration of body reagent in the body and/or the residence time of the body in the bath, as well as the concentration of bulk reagent in the bath. Thus, the properties of assemblies are easily adapted for use in any of a wide number of applications.

In some embodiments, each body reagent is dissolved in a body medium. In this way, control of the concentration of body reagent within the body medium is possible which will provide control over the rate of formation of the capsule shell and properties of the capsule shell such as the maximum possible thickness and shell strength.

In some embodiments, each body is dropped into the bulk medium. For example, bodies may be formed and dispensed outside the bulk medium before coming into contact with the bulk medium at some later point in time. In some embodiments, bodies are formed at a distance above the bulk medium and fall under the influence of gravity into the bulk medium. In other embodiments, bodies are ejected with additional velocity, such as in a jet process (similar to an inkjet process).

Bodies may be dispensed at a distance of at least 100 µm above the surface of the bath, for example at least 200 µm, at least 400 µm, at least 600 µm, at least 800 µm or at least 1 mm above the surface. In this way, bodies will gather enough momentum to penetrate the bath surface. In some cases, where additional momentum is required e.g. for bodies with a diameter of around 2 to 6 mm falling under gravity alone, bodies may be dispensed at a distance of at least 1 cm above the surface of the bath, for example at least 2 cm, 3 cm, 4 cm or 5 cm above the surface.

Bodies may be dispensed at a distance of up to 30 cm above the surface of the bath, for example up to 25 cm, 20 cm or 15 cm above the surface. In some embodiments, bodies are dispensed at a distance of up to 1 cm above the surface, for example up to 8 mm, 6 mm, 4 mm, 2 mm or 1 mm. Limiting the height above the bath in this way reduces the effect of air currents on body trajectories which is especially important for very small droplets.

Alternatively, bodies may be dispensed by a dispensing element directly within the bulk medium. In such embodiments, the body may need to be detached from the dispensing element. For example, raising the element after body formation at the dispensing element can cause the body to detach when the element reaches the surface. Alternatively, the element may be vibrated to detach the body. The element may be a nozzle.

In some embodiments, one of the bulk reagent and the body reagent has a larger molecular weight than the other. In this way, the reagent of smaller molecular weight will diffuse more readily through the nascent capsule shell and the direction and rate of shell growth can be controlled. In preferred embodiments, the bulk reagent has a larger molecular weight than the body reagent. In this way, diffusion of the body reagent is faster than diffusion of the bulk reagent, and as the shell is formed the body reagent will diffuse outwardly though the shell, such that the shell grows outwards, promoting neighbouring shell integration. In preferred embodiments the molecular weight of the bulk reagent is substantially larger than the molecular weight of the body reagent, for example at least a factor of 200 larger, for example at least a factor of 250, 300, 350 or 400 larger. "Molecular weight" here also includes atomic weight where necessary.

In some embodiments, the one of the bulk reagent and the body reagent is a polymer. A polymer provides desirable properties when forming a capsule shell during the methods according to the present invention.

In some embodiments, the polymer is or comprises a biopolymer. Biopolymers are particularly preferred because of their biocompatibility which allows assemblies to be used for applications including human consumption.

In some embodiments, the biopolymer is a polysaccharide.

In some embodiments, the polysaccharide is alginate. Alginate is particularly preferred due to its advantageous gel-forming properties.

In some embodiments, a counter-ion to the alginate comprises an alkali metal ion, for example sodium ion. The sodium alginate may be present in solution at a concentration of at least 0.1% w/v, for example at least 0.2% w/v, at least 0.3% w/v, at least 0.4% w/v, at least 0.5% w/v or at least 0.6% w/v. The sodium alginate may be present in solution at a concentration of up to 5% w/v, for example up to 4% w/v or up to 3% w/v. In some embodiments the sodium alginate may be present in solution at a concentration of up to 0.5% w/v, for example up to 0.4% w/v or up to 0.3% w/v.

Within this range, an alginate shell of sufficient thickness and strength forms around the body medium after reaction of the alginate with a suitable cation. Furthermore a concentration of up to 5% w/v ensures that for a given bath temperature and body composition the bodies are more likely to penetrate the surface fully. At higher alginate concentrations, an increase in bath temperature may be required to counteract the increase in viscosity caused by the relatively high alginate concentration.

In some embodiments, the other of the bulk reagent and the body reagent is for the gelation of the polymer. In other words, the reaction between the polymer and the other reagent produces a gel which forms the capsule shell.

In some embodiments, a multivalent metal cation is provided for the gelation of the polymer. For example, trivalent cations generally produce stronger shells than divalent cations.

In some embodiments, the multivalent metal cation is a divalent ion. In some embodiments, this is a calcium ion.

The calcium ions may be present in solution at a concentration of at least 5 mM, for example at least 10 mM, at least 15 mM, at least 20 mM, at least 25 mM or at least 30 mM. The calcium ions may be present in solution at a concentration of up to 250 mM, for example up to 180 mM, up to 140 mM, up to 90 mM or up to 50 mM.

In some embodiments, a counter-ion to the calcium ion comprises lactate. Calcium lactate is preferable where the intended application for the assembly involves human consumption. Calcium lactate is less bitter than other calcium salts such as calcium chloride. To provide the necessary concentration of calcium ions in solution, the calcium lactate may be present in solution at a concentration of at least 0.1% w/v, for example at least 0.2% w/v, at least 0.3% w/v, at least 0.4% w/v, at least 0.5% w/v or at least 0.6% w/v. The calcium lactate may be present in solution at a concentration of up to 5% w/v, for example up to 4% w/v, up to 3% w/v, up to 2% w/v or up to 1% w/v.

Within the above range, the calcium-polymer gel formed around the body medium is of sufficient thickness and strength that for a given droplet density the assembly when constructed is more self-supporting and has increased structural integrity.

Preferably, the bulk reagent is the polymer and the body reagent is for the gelation of the polymer.

Preferably, the bulk reagent is the polymer and the body reagent is a multivalent cation, such as a multivalent metal cation. In this way, the reaction between the reagents entails the ionic cross-linking of separate polymer chains by intermediate cations, thereby leading to gelation of the polymer.

Preferably, the polymer comprises alginate and the other reagent comprises calcium ions. More preferably, the polymer comprises alginate in the form of sodium alginate solution and the other reagent comprises calcium ions in the form of calcium lactate solution.

Preferably, the bulk medium comprises sodium alginate solution and the body medium comprises calcium lactate solution.

Alternatively, one of the bulk reagent and the body reagent is selected from guar gum, chitosan, kappa carrageenan, iota carrageenan, pectic acid, gelatine, albumin, carbonate salt, lead nitrate, urea or hexane-1,6-diamine. Preferably this is the bulk reagent.

The other of the bulk reagent and the body reagent may alternatively be selected from other metal ions, for example strontium, barium or potassium, borate, phosphate, ethanol, gum arabic, xanthan gum, sodium dodecyl sulfate, sodium dodecylbenzene sulfonate, formaldehyde, decanedioyl dichloride or hexanedioic acid. Preferably this is the body reagent.

In some embodiments, two bodies comprise different body media. For example, two bodies may each comprise a different body reagent. In this way, an assembly may be provided having constituent bodies with different properties, for example some bodies may have a thicker or stronger shell than others. For example, where the bulk medium comprises alginate solution, a body comprising $Ba^{2+}$ ions as body reagent would be expected to form a stronger and more chemically durable shell than a body comprising $Ca^{2+}$ ions as body reagent, see Morch et al. [Y. Morch, I. Donati, B. L. Strand and G. Skjak-Braek, "Effect of $Ca^{2+}$, $Ba^{2+}$, and $Sr^{2+}$ on Alginate Microbeads", Biomacromolecules, 2006, Vol. 7, pp. 1471-1480]. This may be useful where an assembly is required in which only some of the bodies within the assembly are intended to release their contents after construction in reaction to applied stimulus, for example in drug delivery applications. Furthermore, different body media may be desired where they are intended to interact e.g. by diffusion through capsule shells.

In some embodiments, the reaction product (capsule shell) is capable of supporting the assembly structure.

In some embodiments, the strength of the reaction product capsule shell is controlled by controlling the concentration of body reagents. Alternatively or additionally, the strength may be controlled by controlling the concentration of bulk reagents. The strength may further be controlled by adjusting the duration of time which each body spends in the bath. A body left to rest in the bath comprising the bulk reagent for a longer period of time will form a thicker and stronger capsule shell than the same body left to rest for a shorter period.

In some embodiments, a given body is left to rest for up to 120 s before a second body is deposited adjacent to it, for example up to 100 s, up to 80 s, up to 60 s or up to 40 s. In this way the integration of the shells is more likely to be successful because the bodies are placed beside one another while the outward propagation of both shells is still in progress. Moreover, a body left to rest for too long may form a shell of undesirable thickness relative to other bodies, leading to a defect in the final structure of the assembly.

Furthermore, the rate of reaction of the body reagent and bulk reagent in the reaction-diffusion process may be controlled by adapting the concentrations of the body reagent in the body medium and/or the bulk reagent in the bulk medium. Thus, the rate may be increased to reduce the construction time for the whole assembly or reduced to allow for the construction of larger assemblies.

The period of time each body remains in the bath may be increased by e.g. introducing a delay after the formation of one body before the formation of the next.

In some embodiments, the period of time between the formation of any two adjacent bodies is at least 0.5 seconds, for example at least 1 second, at least 2 seconds, at least 3 seconds, at least 4 seconds or at least 5 seconds. A droplet formed too soon after the previous droplet in a nearby lateral position may interact with the previous droplet as they sink within the bath, and this interaction may cause the unwanted effect that droplets settle in a position laterally spaced from the intended position. This unwanted effect may also be compensated for by adjusting the initial positions of deposition, see for example WO 2014/087175.

However, in some embodiments, the period of time between the formation of any two adjacent bodies is at least 10 ms, for example at least 20 ms, at least 30 ms, at least 40 ms or at least 50 ms. Such small intervals may be achieved by e.g. inkjet printing processes for producing the bodies.

In some embodiments, the period of time between the formation of any two consecutive bodies is up to 10 seconds, for example up to 9 seconds, up to 8 seconds, up to 7 seconds or up to 6 seconds. This ensures that construction time is kept as short as possible, which is especially important when large assemblies are being constructed.

In some embodiments, the first and second capsule shells are permitted to contact during the generation of the first or second capsule shell.

In some embodiments, steps (iii)-(v) are repeated one or more times. In some embodiments, steps (iii)-(v) are repeated at least 50 times to provide an assembly comprising at least 50 bodies. The maximum number of repetitions is not particularly limited and depends to a certain extent on the apparatus used. For example, inkjet printing methods may allow thousands or millions of bodies to be formed in an assembly, i.e. thousands or millions of repetitions of steps (iii)-(v) of the method to be performed during the construction of a single assembly. In some embodiments, steps (iii)-(v) are repeated up to 200 times to provide an assembly comprising up to 200 bodies.

In some embodiments, the assembly is constructed by the controlled deposition of consecutive bodies. In some embodiments, this deposition is automated.

In some embodiments, the bodies formed at the dispensing element are droplets, formed by peristaltic pumping. A sensor may be used to control the number of droplets formed by one or more peristaltic pumps. The sensor may be a sensor selected from transmissive optical sensor, reflective optical sensor, electrical sensor or acoustic sensor. Preferably, a transmissive optical sensor is used. Peristaltic pumping provides droplets down to very small volumes and also provides little variation in droplet size. For example, the variation in droplet diameter may be less than 500 µm.

In alternative embodiments, the bodies are droplets formed by jet print-heads, such as those developed for use in inkjet printing. The use of jet printing techniques allows large numbers of droplets of very small volume to be produced in a short period of time.

In alternative embodiments, microfluidic techniques may be used to produce bodies. In this way, the rapid automated production of droplets with precisely controlled diameters (such as in the range of 30 µm to 2 mm) may be achieved.

In some embodiments, the droplets formed by peristaltic pumping have a volume of less than 2 mL, for example less than 1.5 mL, less than 1 mL or less than 0.5 mL. Such small volumes provided by peristaltic pumping allow assemblies to be constructed with greater "resolution". In other words, a greater amount of structural detail can be achieved. In some embodiments, the droplets formed by peristaltic pumping have a volume of less than 50 µL, for example less than 40 µL, less than 30 µL, less than 20 µL, less than 15 µL or less than 10 µL.

In some embodiments of the method, during peristaltic pumping the fall of a droplet is detected and back-pumping is performed to prevent the formation of a further droplet. In this way, it is ensured that only a single droplet is produced at a time, and the position of each droplet and the delay between droplets are properly controlled.

In some embodiments, the droplets formed by inkjet printing have a volume of at least 1 pL, for example at least 2 pL, at least 3 pL, at least 4 pL or at least 5 pL.

In some embodiments, the method of the first aspect further comprises the step of isolating the assembly after formation. The assembly may be removed intact from the bath. The removal may be achieved using a spoon, sieve or by piercing the assembly with an implement. Alternatively the bulk medium may be drained from the bath while the assembly remains in place.

After removal, the assembly may be immersed within a further medium. In this way, evaporation of the contents of the bodies within the assembly may be reduced or prevented. The further medium may be the same or a different aqueous medium, or a hydrophobic medium. In some embodiments the further medium comprises additional body reagent, which provides a means to harden the shells on the outside of the assembly.

In some embodiments, residual bulk medium remaining on an outer surface of the assembly after construction is removed, for example by one or more of drainage, wicking, evaporation or osmosis.

In some embodiments, the method includes the step of dehydrating the assembly after construction. In this way, a dehydrated assembly of hollow bodies may be produced after the body medium is removed. Thus, the body media act as a temporary means to construct a finished dry product. In some embodiments, the structure of the assembly is substantially preserved during the drying step.

In some embodiments, the assembly is coated after construction. The coating may be applied in order to preserve the geometry of the assembly, to reduce the rate of evaporation from the assembly, for decorative purposes or for the modification of texture or mouthfeel of the assembly. In some biotechnological applications, such as tissue engineering, coating of the assembly for example with polyethylene glycol or poly L-lysine may be beneficial.

The coating material for coating of the assembly may be selected from one or more of polyethylene glycol, poly-L-lysine, sugar, gold-leaf, chocolate, shellac, carnauba wax or silicone rubber.

A second aspect of the invention is a method for producing an assembly comprising a plurality of integrated capsules, comprising the steps of:
 (i) depositing a volume of a bulk medium comprising a bulk reagent to form a bath;
 (ii) depositing one or more bodies, each comprising a body reagent, into or onto the bath, wherein a portion of the surface of each body remains exposed above the surface of the bath after deposition;
 (iii) allowing a reaction to occur at the interface between each body and the bulk medium to form a partial capsule shell around the portion of each body in contact with the bulk medium;
 (iv) depositing additional bulk medium to increase the depth of the bath to a level lower than the upper surface of each body, such that a portion of the surface of each body remains exposed above the surface of the bath;
 (v) allowing a reaction to occur at the interface between each body and the bulk medium to form a partial capsule shell around the portion of each body in contact with the bulk medium;
 (vi) repeating steps (ii)-(v) a predetermined number of times to form an assembly; and
 (vii) covering the assembly entirely with bulk medium to form an encapsulated assembly of bodies comprising one or more uninterrupted regions of droplet medium.

A third aspect of the invention is a method for producing an assembly comprising a plurality of integrated capsules, comprising the steps of:
 (i) providing a bath of bulk medium, the bulk medium comprising a bulk reagent;
 (ii) continuously stirring the bath;
 (iii) depositing a plurality of bodies into the bath, each body comprising a body medium, wherein the body or the body medium comprises a body reagent;
 (iv) allowing a reaction involving the body reagent and bulk reagent to occur at the interface between each body and the bulk medium to form a capsule shell around each body;
 (v) allowing the plurality of bodies to migrate towards and form an aggregate at the centre of the bath; and
 (vi) permitting the capsule shells of adjacent bodies in the aggregate to integrate, thereby to form an assembly of bodies.

Preferably the bodies used in the third aspect are spherical droplets.

All the optional features described herein in the context of the first aspect are equally applicable to the second and third aspects.

A fourth aspect of the invention is a droplet assembly comprising a first capsule having a first capsule shell and encapsulating a body, and a second capsule having a second capsule shell and encapsulating a body, wherein the first and second capsule shells are integrated.

In some embodiments, each shell is a gel.

A fifth aspect of the invention is apparatus for the production of an assembly of bodies, the apparatus comprising a dispensing element for the production of individual bodies.

In some embodiments, the apparatus of the fifth aspect is adapted to dispense bodies to pre-determined specified positions, thereby producing an assembly of a pre-determined design.

The invention will now be further described with reference to the following non-limiting Figures and Examples. Other embodiments of the invention will occur to those skilled in the art in the light of these.

Further Advantages, Options and Preferences

Reaction-Diffusion Processes

A reaction-diffusion system is one in which one or more chemical species are able to both react (either with themselves or each other) and diffuse in space. In reverse-spherification processes, a membrane builds up around a body such as a droplet which is immersed within a bulk medium. Taking the calcium alginate system as an example, first calcium in the droplet reacts with alginate in the immediately surrounding volume of the bath, which produces a thin shell of calcium alginate gel at the boundary of the droplet. Further calcium in the droplet then diffuses through this shell and into the bath, where it reacts with alginate immediately around the shell, and thereby thickens the calcium alginate shell. This combination of reaction and diffusion defines a reaction-diffusion process. The shell growth propagates away from the droplet and not into the droplet, because the calcium diffuses through the gel far more readily than the alginate does.

The same process is responsible for "basic" or "direct" spherification. However, in direct spherification shell growth propagates into the droplet. The present invention preferably involves reverse-spherification which leads to outwardly propagating shell formation. This provides for the integration of neighbouring shells and also preserves the internal volume of the bodies, allowing the cargo to remain intact.

Body Media and Bulk Media

In some embodiments, the bulk medium comprises a foodstuff. This may be selected from one or more of water, fruit juice, honey, yoghurt, alcoholic beverage such as wine, spirits and beer, tea, coffee, dressings, sauce and soup. Alternatively or additionally, the bulk medium may comprise nutritional supplements. These may be selected from one or more of vitamins, minerals, fibre, fatty acids, amino acids and polypeptides. Alternatively or additionally, the bulk medium may comprise medicinal or biotechnological products. These may be selected from one or more of drug, animal cells, plant cells, bacteria and other organisms. Alternatively or additionally, the bulk medium may comprise cosmetic products. These may be selected from one or more of mouthwash, toothpaste, soap, cream and fragrance. Alternatively or additionally, the bulk medium may comprise plant extract such as fruit, seed, leaf, stem or vegetable extract.

In some embodiments, the body medium is not an aqueous medium but is coated with an aqueous medium. For example, the body medium may be an oil coated with an aqueous solution which comprises the body reagent. In this way, the range of possible body media is increased to include a wide range of non-aqueous media such as hydrocarbons, lipids, hydrophobic pharmaceutical products, organic solvents such as ethanol and isopropanol, solutions in organic solvents, plant oils and water-in-oil emulsions. In this way the body medium may also be a solid.

When the body medium is non-aqueous, in some embodiments the aqueous medium comprising the body reagent is sprayed onto the body medium after formation. Alternatively, the body may be passed through an aqueous solution for coating. In some embodiments, the body medium is liquid when formed but solidifies after formation and before coating to facilitate coating with the aqueous medium. For example, the body may be formed at a temperature above the melting temperature of the body medium and be allowed to cool to a temperature below the melting temperature before coating. The cooling may occur for example as the body falls towards a bulk medium after formation.

In some embodiments, the body medium and bulk medium comprise chemical systems which react to form an organogel. An organogel is a gel in which the liquid phase is organic rather than aqueous (see Jha et al. ["Organogel: A Novel Drug Delivery System", Journal of Current Pharmaceutical Research, 2013, Vol. 11, No. 1, pp. 6-15]). Therefore in some embodiments, the bulk medium is hydrophobic and the capsule shell formed is an organogel. In some embodiments, the bulk medium comprises lecithin and the body medium comprises an aqueous or other polar solution, which causes a lecithin organogel to form at the interface between body medium and bulk medium.

In some embodiments, the body medium is a suspension. In some embodiments, the bulk medium is a suspension. For example, the body medium and/or the bulk medium may be emulsions. Oil-in-water emulsions are preferred because the presence of an aqueous continuous phase requires little or no adaptation to the techniques described herein. In some embodiments, the emulsion separates after the assembly has been created.

In some embodiments, the body media are degassed before body formation. This may be achieved by e.g. placing the medium in a vacuum chamber or a centrifuge. Degassing ensures that no bubbles of gas remain in the medium after formation of the assembly, since the presence of bubbles may be detrimental to the formation of the assembly or to the properties of the assembly.

However in some embodiments it may be desirable for a gas to be present within the medium. A gas which is already present may therefore be retained during body formation, or a gas may be deliberately entrained within the medium during deposition of the body.

When bodies are dropped into the bulk medium, one or both of the body medium and bulk medium may be modified to facilitate penetration of the bulk medium by the body. In some embodiments, the viscosity of the body medium may be increased, for example by increasing the solute concentration in the body medium, by decreasing the temperature of the body or by the addition of a thickening agent such as xanthan gum, sugar or other known agent. Alternatively or additionally, the viscosity of the bulk medium may be decreased, for example by decreasing the solute concentration in the bulk medium or by increasing the temperature of the bulk medium. In the latter case, the temperature of the bulk medium may be actively controlled synchronously with droplet production.

Viscosities of individual solutions may vary depending on, inter alia, the temperature, the length distribution of the polymer (e.g. alginate) and the shear rate applied to solutions during the process. The skilled person can adjust the viscosity of the bulk solution, bath solution or both to achieve the necessary conditions, which may be assessed empirically.

Measurement of absolute viscosities is not necessary. Nevertheless, the measurement of the viscosity of xanthan gum solutions is described in Garcia-Ochoa et al. [F. Garcia-Ochoa, V. E. Santos, J. A. Casas and E. Gomez, "Xanthan gum: production recovery, and properties", Biotechnology Advances, 2000, Vol. 18, pp. 549-579] and Zhong et al. [L. Zhong, M. Oostrom, M. J. Truex, V. R. Vermeul and J. E. Szecsody, "Rheological behaviour of xanthan gum solution related to shear thinning fluid delivery for subsurface remediation", Journal of Hazardous Materials, 2013, pp. 160-170]. The viscosity of sucrose solutions is discussed in Swindells et al. [J. F. Swindells, C. F. Snyder, R. C. Hardy and P. E. Golden, "Viscosities of Sucrose Solutions at Various Temperatures: Tables of Recalculated Values", Supplement to National Bureau of Standards Circular 440, Jul. 31 1958].

It is known that solutions of xanthan gum are pseudoplastic; their viscosity decreases as the shear rate increases. A higher ejection speed of a body from a dispensing element will cause an increased shear rate thereby reducing the viscosity of a xanthan gum solution. Therefore, in some embodiments where high ejection speeds are employed (e.g. where ink-jet printer heads are used as the dispensing element) a higher concentration of xanthan gum may be required to counteract this effect and maintain the required viscosity. Alternatively, a solution with less pronounced shear-thinning characteristics may be used.

The rate of reaction between the body reagent and bulk reagent may affect the ability of the body to penetrate the bath. For example, for high reaction rates the capsule shell forms quickly at the lower surface of the body when the body contacts the surface of the bulk medium. This may prevent the entire droplet from penetrating the surface of the bath. In some embodiments, the reaction rate is reduced to avoid this situation.

In some embodiments, the body medium comprises a solution of calcium ions, a viscosity increasing agent which may be a polysaccharide such as xanthan gum or carboxymethyl cellulose and a density increasing agent which may be a sugar, a polysaccharide or glycerol. The sugar may be sucrose or fructose. The polysaccharide may be maltodextrin or carboxymethyl cellulose.

The density increasing agent may be added directly to the calcium solution to form the body medium. Alternatively, a component may be added to the body medium which contains the density increasing agent, for example a sugar solution such as a fruit juice or honey. The fruit juice may be natural or synthetic.

Preferably, the body medium comprises the thickening agent at a concentration of at least 0% w/v, for example at least 0.1% w/v, at least 0.2% w/v, at least 0.3% w/v, at least 0.4% w/v or at least 0.5% w/v. In some embodiments, the body medium comprises the thickening agent at a concentration of at least 1% w/v. Preferably, the body medium comprises the thickening agent at a concentration of up to 5% w/v, for example up to 4% w/v, up to 3% w/v, up to 2% w/v or up to 1% w/v.

Preferably, the body medium comprises the density increasing agent at a concentration of at least 0% w/v, for example at least 0.1% w/v, at least 0.2% w/v, at least 0.3% w/v, at least 0.4% w/v or at least 0.5% w/v. In some embodiments, the body medium comprises the density increasing agent at a concentration of at least 5% w/v, for example at least 10% w/v or at least 15% w/v. Preferably, the body medium comprises the density increasing agent at a concentration of up to 50% w/v, for example up to 40% w/v, up to 30% w/v, up to 20% w/v, up to 15% w/v or up to 10% w/v. The amount of density increasing agent required will depend on factors such as the viscosity and density of the bath, which may in turn depend on the bath temperature.

In some embodiments, the body medium further comprises a foodstuff. This may be selected from one or more of water, fruit juice, honey, yoghurt, alcoholic beverage such as wine, spirits and beer, tea, coffee, dressings, sauce and soup. Alternatively or additionally, the body medium may further comprise nutritional supplements. These may be selected from one or more of vitamins, minerals, fibre, fatty acids, amino acids and polypeptides. Alternatively or additionally, the body medium may further comprise medicinal or biotechnological products. These may be selected from one or more of drugs, animal cells, plant cells, bacteria and other organisms. Alternatively or additionally, the body medium may further comprise cosmetic products. These may be selected from one or more of mouthwash, toothpaste, soap, cream and fragrance. Alternatively or additionally, the body medium may further comprise a plant extract such as fruit, seed, leaf, stem or vegetable extract.

In some embodiments, the temperature of the bath is adjusted to facilitate penetration by the bodies. The bath temperature may be at least 1° C. In this way, it can be ensured that the bath does not freeze. In some embodiments, the bath temperature may be at least 20° C., for example at least 21° C., at least 22° C., at least 23° C., at least 24° C. or at least 25° C. In this way, a relatively low bath viscosity is possible. Where a higher bath viscosity is required, for example when bodies are large or of high density, the bath temperature may be up to 60° C., for example up to 50° C., up to 40° C., up to 30° C. or up to 25° C. In some embodiments, the bath temperature may be up to 100° C. In this way the use of very small bodies or baths containing a very viscous bulk medium may be accommodated.

The temperature may be adjusted to compensate for other changes in properties of the bulk medium and/or the body medium. For example, when the bulk medium contains a higher concentration of bulk reagent (e.g. alginate), the temperature may be increased accordingly to compensate for the greater viscosity imparted by the high reagent concentration. The sinking rate of bodies in the bath also depends upon the bath viscosity and therefore also upon bath temperature. An increase in bath temperature may therefore be used to increase the sinking rate of bodies.

In some embodiments, the surface tension of the body medium and/or the bulk medium may be adjusted to facilitate penetration. For example, the surface tension of the body medium may be increased, and/or the surface tension of the bulk medium decreased. A decrease in surface tension may be achieved by the addition of surfactants to the bulk medium.

In known methods for assembly construction which utilise amphiphile monolayer and bilayer formation around droplets, the addition of surfactants in this way would not be tolerated because it would destabilise the assembly. Thus the present method provides the facilitation of assembly formation by methods which would be unsuitable in previous processes.

In alternative embodiments, it may be desirable that the bodies do not fully penetrate the bulk medium after formation and deposition of the body. For example, it may be desirable for a body to remain at least partially on the surface of the bulk medium.

In some embodiments, the extent of reaction between the body reagent and the bulk reagent is limited, for example by decreasing the concentration of reagent in one or both of the body medium and the bulk medium. Alternatively or additionally, the extent of reaction may be limited by providing a rate-limiting chemical species within one or both of the body medium and the bulk medium, for example a chelating agent.

In this way, where one of the media contains an auxiliary component such as a density increasing agent or a reagent intended to provide a suitable environment for another component, the chelating agent chelates this auxiliary component and prevents its unwanted reaction with other components. For example, the auxiliary component may have some reactivity towards the body reagent and/or the bulk reagent, which would affect the shell formation rate and the achievable shell thickness. Chelation to the auxiliary component will reduce the occurrence of these side-reactions while preserving the intended function of the auxiliary component.

In some embodiments, an implement is used to exert a force on the body after deposition, to facilitate penetration into the bulk medium. The implement may be a part of a nozzle from which the body is produced. Where droplets are formed at a distance above a bath of bulk medium, the nozzle may be lowered towards the bath to force the body into the bath before subsequently being raised again into the initial position for body deposition.

In the methods according to the first aspect of the invention it is important that the rate at which bodies bond to one another to allow shell integration is controlled so that the bodies bond rapidly enough to construct the desired assembly in an efficient and effective manner.

The inventors have found that control of the relative rates of sinking and shell formation is important for satisfactory assembly construction, to ensure that deposited droplets come to rest in their intended positions thereby avoiding structural defects in the assembly. When the sinking rate is too high relative to the shell integration rate, bodies do not bind together when they meet but may roll off one another into unintended positions. In contrast, when the shell integration rate is too high relative to the sinking rate, the shell of each body is excessively thick before binding to another body, or the body binds to a different body than intended, or the body sinks too slowly due to the rapid shell growth. As a result, the sinking speed should be fast enough to ensure efficiency of assembly construction for practical reasons, while controlling the shell formation rate such that the relative rates are satisfactory as explained above.

In addition, the inventors have found that when the period of time between the formation of two consecutive bodies is too short, the sinking bodies may interact with the result that they settle within the bulk medium in a position removed from their intended position. This may result in incomplete shell integration, the absence of shell integration or complete shell integration but with bodies adopting an incorrect position. Therefore, in some embodiments a delay between the deposition of consecutive bodies is introduced to overcome this problem.

In some embodiments, the bodies and/or bulk media are adapted such that bodies sink in the bulk medium at a speed of up to 5 mm s$^{-1}$, for example up to 4.5 mm s$^{-1}$, up to 4 mm s$^{-1}$, up to 3.5 mm s$^{-1}$ or up to 3 mm s$^{-1}$. In this way, the sinking speed is not so high as to have a detrimental effect on droplet shape or position.

In some embodiments, bodies may be neutrally buoyant, i.e. having a sinking rate of zero. This may be important where the assembly is to include overhang structures. In some embodiments the sinking rate may be at least 0 µm s$^{-1}$, for example at least 100 µm s$^{-1}$ or at least 200 µm s$^{-1}$. Lower sinking rates may be useful in processes where bulk solution is added to a bath incrementally during assembly construction.

Within this range of sinking rates, the bodies bond with each other to form the assembly more effectively and their placement in the bath is more precise.

The sinking rate may be controlled by modifying the size of the body. It is well known that the terminal velocity of a sphere falling under gravity through a liquid at low Reynolds number (which holds for slow sinking through a viscous liquid) is given by the equation:

$$v=gd^2(r_d-r_b)/(18m)$$

where v is the terminal sinking velocity of the sphere, g is acceleration due to gravity, d is the sphere diameter, $r_d$ is the sphere density, $r_b$ is the bath density and m is the dynamic viscosity of the bath. This formula will be approximately accurate in the present invention where shell propagation is slow, because for fast shell propagation the sphere diameter will increase as the sphere falls and this is not provided for by the above equation.

Alternatively the density of the body medium and/or the density of the bulk medium may be modified to control sinking rate. In the latter case, the density of either may be modified by changing the concentration of a chemical species within the media. This species may be the body reagent or bulk reagent. Alternatively or additionally, the species may be a sugar or polysaccharide, for example maltodextrin. The species may be another solute or may be in suspension.

In embodiments where the body medium is high density (for example, when the body medium comprises a high concentration of sugar), it may be necessary to increase the density of the bath accordingly to achieve the required sinking rate of the bodies. Thus, a density increasing agent may be added to the bath solution. This may be a sugar or a polysaccharide.

To control the sinking rate, the density of the body medium and/or the bulk medium may also be modified by changing their temperature.

To control the sinking rate, the viscosity of the bulk medium may be modified in the same was as described above with respect to penetration.

In some embodiments, the sinking time of bodies in the bath of bulk medium is minimised by providing a minimum level of bulk medium required for assembly formation. For example, the level of bulk medium may be up to 300 mm above the uppermost surface of the assembly during construction. This will allow for processes which use relatively large bodies to form the assembly. In some embodiments, the level of bulk medium may be up to 30 mm above the uppermost surface of the assembly during construction, for example up to 25 mm, 20 mm, 15 mm or 10 mm. The level may be at least 100 µm, for example at least 500 µm or at least 1 mm. For larger droplets, a level of at least 5 mm may be used.

During construction of the assembly, the level of the bulk medium may be maintained sufficiently by the addition of bulk medium to the bath during the construction.

Alternatively, the simple displacement of bulk medium by bodies added to the medium may in itself be sufficient to provide an adequate level of bulk medium.

According to a second aspect of the invention, a method for producing an assembly comprises the steps of:
  (i) depositing a volume of a bulk medium comprising a bulk reagent to form a bath;
  (ii) depositing one or more bodies, each comprising a body reagent, into or onto the bath, wherein a portion of the surface of each body remains exposed above the surface of the bath after deposition;
  (iii) allowing a reaction to occur at the interface between each body and the bulk medium to form a partial capsule shell around the portion of each body in contact with the bulk medium;
  (iv) depositing additional bulk medium to increase the depth of the bath to a level lower than the upper surface of each body, such that a portion of the surface of each body remains exposed above the surface of the bath;
  (v) allowing a reaction to occur at the interface between each body and the bulk medium to form a partial capsule shell around the portion of each body in contact with the bulk medium;
  (vi) repeating steps (ii)-(v) a predetermined number of times to form an assembly; and
  (vii) covering the assembly entirely with bulk medium to form an encapsulated assembly of bodies comprising one or more uninterrupted regions of droplet medium.

Here, "uninterrupted" means that the assembly lacks at least some of the internal partitions between individual bodies which would form due to the entire surface of each body in the assembly being exposed to the bulk medium after deposition.

In some embodiments, a body is deposited such that a portion of the body is in contact with the exposed portion of a previously deposited body. In this way, a region of droplet medium originating from a plurality of deposited droplets is preserved as a single homogeneous region within the final assembly, i.e. without internal capsule shells separating the individual droplets. Therefore, in some embodiments the method allows large capsules of predetermined shape and size containing a homogeneous medium to be constructed from individual droplets. For example, a column may be constructed by the vertical stacking of droplets on top of one another. The assembly may therefore consist of a single uninterrupted region of droplet medium.

A range of assembly shapes may be constructed using this method.

In some embodiments, the body medium is adapted so that the bodies do not penetrate the bath but float on the surface. Thus in step (ii) the first body may be deposited onto the bath and in step (iii) a partial shell will form at the base of the body where it rests on the bath surface. Step (iv) may then be used to increase the level of bulk medium around the body.

In some embodiments, the bodies sink in the bath but the depth of the bath is adapted to ensure that in step (ii) a portion of the surface of the body remains exposed above the surface of the bath after deposition. For example, the depth of the bath will be set smaller than the diameter of bodies dispensed.

In some embodiments, the bodies are approximately neutrally buoyant, and penetrate the bath partially or to an insignificant extent.

In some embodiments, at least one of the bodies is a contiguous body formed from the coalescence of multiple individually dispensed bodies. For example, during step (ii) an initial body may be dispensed onto the bath surface followed by a further body in an adjacent position. The two bodies will coalesce (because they are not entirely enclosed by capsule shells) to form a contiguous first body. Steps (iii) and (iv) of the method will then be performed. Subsequently, the following body of step (ii) may also be a contiguous body formed from the coalescence of multiple individually dispensed bodies.

In some embodiments, an additional volume of bulk medium is deposited in step (iv) so that the bodies deposited in the previous step (ii) become entirely surrounded by bulk medium. In this way, the bodies deposited in the previous step (ii) acquire a capsule shell which covers their upper surface thereby separating them from bodies deposited above them in the following step (ii).

Any of the preferred options described herein with respect to the method according to the first aspect may be applied equally to the method according to the second aspect.

According to a third aspect of the invention, a method for producing an assembly comprising a plurality of integrated capsules comprises the steps of:
  (i) providing a bath of bulk medium, the bulk medium comprising a bulk reagent;
  (ii) continuously stirring the bath;
  (iii) depositing a plurality of bodies into the bath, each body comprising a body medium, wherein the body or the body medium comprises a body reagent;
  (iv) allowing a reaction involving the body reagent and bulk reagent to occur at the interface between each body and the bulk medium to form a capsule shell around each body;
  (v) allowing the plurality of bodies to migrate towards and form an aggregate at the centre of the bath; and
  (vi) permitting the capsule shells of adjacent bodies in the aggregate to integrate, thereby to form an assembly of bodies.

In this way, an assembly of randomly positioned droplets may be formed very quickly using very simple, low-cost apparatus. The bath may be stirred by any suitable stirring means, for example by continuous rotation of the container in which the bath resides. The droplets may be deposited by a fixed nozzle situated above the bath, either on or away from the axis of rotation. After deposition the droplets will migrate to the centre of the bath due to the "tea leaf paradox", according to which free bodies in a stirred liquid in a vessel will migrate to the bottom centre of the vessel if the bodies are denser than the liquid.

Assemblies of any size may be constructed using this method and the construction time is reduced relative to the controlled deposition processes described herein. In applications where speed of assembly construction is of greater importance than control over the assembly geometry, this method offers significant advantages.

Any of the preferred options described herein with respect to the method according to the first aspect may be applied equally to the method according to the third aspect.

Assembly

In some embodiments, the thickness of the outer surface of the finished assembly is controlled by introducing a delay after the assembly is completed before removal from the bath. In this way, different thicknesses of capsule shell may be provided (a) around each internal body of the assembly, and (b) around each external body of the assembly, i.e. around the periphery of the complete assembly.

In some embodiments, after construction of the assembly is completed the assembly is left to reside in the bulk medium bath for at least 0 seconds, for example at least 5 seconds, at least 10 seconds, at least 15 seconds, at least 20 seconds, at least 25 seconds or at least 30 seconds. This ensures the formation of a peripheral capsule around the entire assembly of sufficient thickness to support the structure.

In some embodiments, after construction of the assembly is completed the assembly is left to reside in the bulk medium bath for up to 24 hours. Longer residence times provide a thicker membrane which may be useful where additional protection for the assembly is required or where a greater barrier to diffusion is necessary. In other embodiments, the assembly is left to reside in the bulk medium bath for up to 10 minutes, for example up to 9 minutes, up to 8 minutes, up to 7 minutes, up to 6 minutes, up to 5 minutes or up to 4 minutes. In this way, the capsule shell does not become so thick as to limit the usefulness of the assembly in certain applications, for example where facile dissolution or rupture of the external shell is required.

In some embodiments, the thickness of the capsule shell around each body within the assembly is at least 20 μm. This provides a shell of sufficient thickness to support the contents of bodies in the assembly. Thinner membranes are useful where delicate "high resolution" assemblies are required, incorporating very small bodies. In other embodiments, the thickness of the capsule shell around each body within the assembly is at least 1 mm, for example at least 2 mm, at least 3 mm or at least 4 mm. In some embodiments, the thickness of the capsule shell around each body within the assembly is up to 5 mm, for example up to 4.5 mm, up to 4 mm, up to 3.5 mm or up to 3 mm.

In some embodiments, the capsule shell entirely encapsulates the body medium. In some embodiments, every body in the assembly is fully encapsulated by a capsule shell.

In some embodiments, the bodies are substantially spherical droplets at least 20 μm in diameter, for example at least 30 μm, 40 μm or 50 μm. Such small diameter droplets may be produced by e.g. inkjet printing methods using inkjet printer heads to produce the droplets. In some embodiments, the bodies are substantially spherical droplets at least 2 mm in diameter, for example at least 2.5 mm or 3 mm in diameter. In this way, the construction of an object of a given size is possible more rapidly, using fewer, larger bodies.

The droplets may be up to 6 mm in diameter, for example up to 5.5 mm, 5 mm, 4.5 mm, 4 mm, 3.5 mm or 3 mm in diameter. In this way, droplets maintain their structural integrity due to the high strength of the capsule shell.

If droplets are too small, for a given ejection speed and relative viscosity (i.e. the viscosity of the body medium relative to the bulk medium) the surface of the bulk medium bath will not be properly penetrated. Furthermore, if droplets are too large, for a given ejection speed and relative viscosity the droplets are more likely to become aspherical. This may be undesirable in applications where spherical droplets are required, but may be desirable in other cases.

In some embodiments, the bodies are spherical or substantially spherical droplets. In other embodiments, the bodies have a different shape, for example a tapered shape, such as a "teardrop" shape. This is made possible due to the presence of the structurally rigid capsule shell which maintains the shape of the body once formed. Tailoring of the droplet shape in this way is impossible in previous methods which use amphiphilic molecules to form a monolayer membrane around a droplet.

The shape of the body may be controlled by modification of one or more of body volume, ejection speed of the body, the direction of ejection of the body relative to the bulk medium bath, the density of the body, the density of the bath, the surface tension of the bath or the viscosity of the bath.

In some embodiments, the orientation of the body within the assembly is determined by the direction of the velocity of the body as it enters the bath of bulk medium.

The direction of the velocity of the body as it enters the bath of bulk medium may in turn be determined by the velocity of ejection of the body. The velocity of ejection may be controlled, for example, after ejection of the body. This may be by an electrostatic mechanism.

In some embodiments, the assembly has one-dimensional geometry. In other words, a single row of two or more droplets may make up the assembly. Alternatively, the assembly may have two-dimensional geometry, wherein the assembly is made up of a plurality of droplets within a single plane.

In some embodiments, the assembly has three-dimensional geometry, for example comprising multiple planes of bodies stacked upon one another.

In some embodiments, the assembly is built by the sequential formation of horizontal layers. In some embodiments, each horizontal layer comprises two or more regions each comprising a plurality of bodies. The bodies in a first region may comprise a body medium which is different from and reactive towards the body medium of the bodies in a second region.

In some embodiments, the bodies in the assembly form a regular array. The array may be a lattice structure.

In some embodiments, the bodies in a first region differ in one or more properties selected from size, shape and assembly structure. For example bodies in a first region may be arranged in a first pattern and bodies in a second region may be arranged in a second pattern, the first and second patterns being different.

In some embodiments, a region of the assembly may comprise droplets with a close-packed lattice structure. For example, the region may comprise hexagonal or cubic close-packing of droplets. In this way, the volume of body medium in the assembly can be maximised relative to the volume of bulk medium. This will provide for improved mouthfeel when the assembly is intended for human consumption, because the fraction of liquid in the assembly will be greater. Close-packing will also provide for minimum separation between neighbouring bodies to facilitate the migration of species between bodies, where this is necessary for example in some tissue engineering applications.

The skilled person will understand that the greatest possible fraction of space occupied by spheres in a close-packed arrangement is $\pi/3\sqrt{2}$, i.e. 74.048%. The remaining volume of the assembly will be occupied by residual bulk medium and capsule shell material which has propagated into the inter-sphere regions.

In other embodiments, a non-close-packed arrangement of droplets, such as a simple cubic lattice arrangement may be used in a region of the assembly.

In some embodiments, the assembly comprises multiple types of body, for example multiple types of droplet. Each type of droplet may contain a different medium, be a different size and/or be a different shape. In some embodiments, droplets within the assembly differ in size, allowing the "resolution" of the assembly to vary within the assembly. For example, a peripheral region of the assembly may comprise bodies of smaller size to allow a greater level of detail to be achieved in the geometry of the outer surface.

In alternative embodiments where efficiency of assembly construction is more important than the control of the size or structure of the assembly, the production method may produce bodies with uncontrolled variation in diameter.

In some embodiments, the assembly is built up on the surface of an object. The object may thus be augmented by addition of the droplet assembly. For example, the object may be a fruit onto which an assembly is constructed. The assembly may improve the overall shape, colour, flavour and/or texture of the fruit, among other properties.

In some embodiments, the assembly comprises a first body comprising a first body medium, wherein the first body medium comprises a first chemical species, and the assembly further comprises a second body comprising a second body medium, wherein the second body medium comprises a second chemical species. The first and second chemical species may be reactive towards one another. The first and second chemical species may react by diffusion across intervening capsule shells. Alternatively or additionally, the first and second chemical species may react when the capsule shells are disrupted to allow them to mix, for example by physical rupture.

The reaction between first and second chemical species may produce a desirable output. For example, it may produce one or more of light, a change in colour, a change in temperature, a change in pH, a change in flavour, a change in odour, a soluble reaction product, a precipitate or a gas.

In some embodiments, one or more bodies in the assembly are responsive to one or more external stimuli. Alternatively or additionally, the capsule shells may be responsive to one or more external stimuli. Yoshida et al. [R. Yoshida and T. Okano, "Stimuli-Responsive Hydrogels and Their Application to Functional Materials", Biomedical Applications of Hydrogels Handbook, 2010, pp. 19-43] and Garg et al. [T. Garg, S. Singh and A. K. Goyal, "Stimuli-Sensitive Hydrogels: An Excellent Carrier for Drug and Cell Delivery", Critical Reviews™ in Therapeutic Drug Carrier Systems, 2013, Vol. 30, pp. 369-409] describe stimuli-responsive hydrogels which may be used in such capsule shells.

The stimuli may be selected from one or more of mechanical stimuli, change in temperature, change in illumination level, application of electric or magnetic fields, the presence of one or more specific chemicals or a change in pH. The body may respond to the stimuli by, for example, changing shape (common for stimulus-responsive gels) producing light, changing colour, changing temperature, changing pH, changing flavour, changing odour, producing a precipitate or producing a gas.

In some embodiments, a change in colour of one or more bodies in the assembly is achieved by the presence of temperature-sensitive dyes. In other embodiments, a change in colour is achieved by controlled aggregation and disaggregation of particles in suspension within the body medium, where the control is effected by light, pH, specific chemicals or electric or magnetic fields.

In some embodiments, the body medium solidifies after formation of the droplet or formation of the assembly. This may be achieved by, for example, providing a droplet medium which is at a temperature higher than its melting point at initial droplet formation, and providing an ambient temperature later in the process which is below that melting point. The ambient temperature below the melting point may be provided only upon completion of the final assembly, to facilitate the necessary diffusion of body reagent through the shell during construction. In this way, entirely solid assemblies of droplets may be produced. Alternatively, the droplet medium may be selected such that it remains liquid at the ambient temperature.

In some embodiments, first and second bodies are substantially identical. For example, the bodies may be the same size, within the tolerance of the body forming apparatus, and the bodies may have the same composition. This allows a homogeneous assembly to be produced.

In some embodiments, the assembly may undergo a shape change after construction. This may be spontaneous, for example due to mass transfer of liquid from one region of the assembly to another. The mass transfer may be caused by osmotic pressure due to differing concentrations of osmolyte between regions. The capsule shells will be impermeable to the osmolyte but permeable to the body medium solvent. The osmolyte may be albumin.

Alternatively, the shape change may be in response to a stimulus.

In some embodiments, the bulk medium comprises a foodstuff, which may be as defined above.

In some embodiments, the assembly of the fourth aspect comprises further capsules, where each capsule has a capsule shell and encapsulates a body, and the capsule shell is integrated with at least one capsule shell of another capsule, and the shell of each further capsule is a gel.

In some embodiments, each capsule in the assembly has a diameter of at least 20 µm in diameter, for example at least 30 µm, 40 µm or 50 µm. Such small diameter capsules may be produced by e.g. inkjet printing methods using inkjet printer heads to produce the droplets. In some embodiments, the capsules are at least 2 mm in diameter, for example at least 2.5 mm or 3 mm in diameter. In this way, the construction of an object of a given size is possible more rapidly, using fewer, larger bodies.

The capsules may be up to 10 mm in diameter, for example up to 9 mm, 8 mm, 7 mm, 6 mm, or 5 mm in diameter. In this way, capsules maintain their structural integrity within the assembly.

In some embodiments, the assembly comprises at least 3 bodies, for example at least 4, 5, 6, 7, 8, 9 or 10 bodies. In some embodiments, the assembly comprises at least 15 bodies, for example at least 20, 25, 30, 35, 40, 45 or 50 bodies. There is no particular limit on the maximum number of bodies in the assembly. In embodiments where techniques such as inkjet printing are used to create the assembly, the assembly may comprise thousands or millions of droplets. In some embodiments, the assembly comprises up to 1000 bodies, for example up to 900, 800, 700, 600, 500, 400, 300 or 200 bodies.

It will be understood that the upper limit of the number of bodies in the assembly depends upon various factors. For example, for a given size of horizontal layer present in the assembly, there will be a limit placed on the total possible number of stacked horizontal layers in the assembly before the assembly is no longer able to support its own weight. In this regard, the densities of the body and bulk media, strength of capsule shells and structure of the assembly also have an effect. Furthermore, time constraints mean that the total number of bodies in an assembly may be limited, especially where only one dispensing element is used as part of the apparatus to produce the assembly. For example, where a single dispensing element is used which produces one body every 3 seconds, an assembly of 50 bodies will take 150 seconds or 2.5 minutes to produce. In order to produce larger assemblies in shorter time periods, apparatus comprising multiple dispensing elements may be employed.

In some embodiments, the assembly is coated.

In some embodiments, the assembly is edible.

In some embodiments, the assembly contains a foodstuff, which may be as defined above.

In some embodiments, the assembly comprises one or more fermenting agents. In this way, fermentation occurs after construction of the assembly to produce a fermentation product within the assembly. The product may be a carbonated product, for example beer.

In some embodiments, the assembly is adapted to mimic one or more of the shape, size, colour, texture, flavour or aroma of a fruit.

In some embodiments, the assembly is adapted to mimic one or more of the shape, size, colour, texture, flavour or aroma of a particular fruit, and the assembly comprises natural or synthetic juice of that fruit. In this way, a very close approximation to a natural fruit in terms of both appearance and flavour is created. The juice may be the principal component of at least one body within the assembly.

In alternative embodiments, the assembly is adapted to mimic one or more of the shape, size, colour, texture, flavour or aroma of a particular fruit, and the assembly comprises natural or synthetic juice of a different fruit.

In some embodiments, the body further comprises a foodstuff, which may be as defined above.

In some embodiments, the assembly is adapted for use as a cosmetic product. This may be for example a mouthwash, toothpaste, soap or skin cream.

In some embodiments, the properties of the assembly are chosen according to data. The data may include the personal preferences of a consumer, medical data, weather data and/or social media data.

In some embodiments, the assembly is adapted for use in the field of biotechnology. For example, the capsules or surrounding material may comprise plant or animal cells for the growth of plant or animal tissues.

In some embodiments, the capsules or surrounding material comprise bacterial, plant or animal cells and the assembly is adapted for use as a platform for experimental methods, such as drug testing, or for tissue engineering purposes, such as the production of scaffolds for the growth of tissues, space-filling scaffolds, scaffolds for drug delivery, scaffolds for cell delivery, or as wound dressings, or as mimics of tissues for surgical training or planning.

Dispensing Apparatus

In some embodiments of the method, bodies are formed by at least one dispensing element. The dispensing element may be positioned above the bulk medium. The dispensing element may comprise one or more nozzles. The dispensing element may comprise an inkjet printer head. In some embodiments, bodies are formed by a spray, an ink-jet printer, a micro-fluidic system or an electrostatic generator.

In some embodiments, bodies fall from the dispensing element only under the influence of gravity. In other embodiments, bodies are ejected from the dispending element with a finite velocity.

In some embodiments, bodies are formed by multiple dispensing elements. In some embodiments, only one dispensing element produces a body at any one time. In other embodiments, bodies are produced by multiple dispensing elements simultaneously. The use of multiple dispensing elements for simultaneous formation of bodies increases the assembly construction rate.

In some embodiments, a second dispensing element is adapted to produce bodies with properties different to the bodies produced by a first dispensing element. For example, the second dispensing element may produce bodies comprising a different body medium, of different size, of different shape, of different ejected velocity or of different temperature. In this way, an assembly of heterogeneous structure may be efficiently produced.

In some embodiments, the dispensing element is movable relative to the bath of bulk medium. In this way, bodies are dispensed at specific positions within the bath. The dispensing element may be movable for example using a translation stage to move the dispensing element and/or the bath. This may be a polar or a Cartesian translation stage, or any other translation mechanism, such as a six-axis or SCARA robot. The order in which the droplets are deposited may be according to for example a raster scanning pattern, a boustrophedon pattern, an alternating checkerboard pattern or another pattern. In some embodiments, the movement of the dispensing element, the movement of the bath and/or the production of bodies at the dispensing element is controlled by a microcontroller.

The microcontroller may be adapted to receive a sequence of commands from a local or remote computer prior to or during the printing process, to build an assembly of a pre-determined structure defined according to software. Alternatively, the commands may be received according to real-time input from a user.

In some embodiments, the dispensing element and bath are stationary relative to one another, and bodies are dispensed to specific positions using multiple dispensing elements positioned above those specific positions. Alternatively, there may be a single static dispensing element and means for guiding each droplet to a desired position.

Various embodiments described herein in the context of the method according to the first aspect are equally applicable to the assembly of the fourth aspect.

Various embodiments of the apparatus described herein in the context of the method according to the first aspect are equally applicable to the apparatus of the fifth aspect.

Additional Features
Translation Stage

As mentioned above, the dispensing element may be movable relative to the bath using a SCARA robot. The SCARA robot may comprise an articulated arm with two joints, the arms being rotatable about the joints in a substantially horizontal plane. The motion of each arm about the joints may be performed by a suitable motor, such as a servo motor. In some embodiments a Dongbu Robot HerkuleX DRS-0101 servo motor may be used. Alternatively, a custom-made servomechanism may be used which for example comprises a DC motor with a rotary encoder, which would allow lower-cost implementation.

The use of the SCARA robot allows a wide area to be covered by the dispensing element, and a SCARA robot is more easily adaptable to achieve different geometries of working area than a simple Cartesian translation stage.

Furthermore, the overall design of the apparatus is more compact with a smaller footprint through use of the SCARA robot. Fewer parts are used as compared with a Cartesian translation stage providing for easier assembly, lower cost and lighter weight. Whereas the SCARA requires only two motors, two brackets and one mounting point, a Cartesian translation stage requires two motors, two lead screws, two lead screw nuts, four guide rods, four linear bearings and two end support bearings. Furthermore, the SCARA is supportable from only one point which provides greater visibility of the assembly formation process which is crucial for proper monitoring of the process.

Dispensing Element

As discussed above, the dispensing element may comprise a peristaltic pump which conveys a droplet from a reservoir to a dispensing nozzle.

Alternatively, a preferred dispensing element may comprise an air pump in fluid communication with a holding chamber which in use contains a reservoir of droplet medium. The reservoir is also in fluid communication with the dispensing element, which may be a nozzle.

In use, the apparatus is provided with a quantity of droplet medium contained within the chamber and may provide for actuation of the air pump to increase air pressure within the chamber, thereby pressurising the reservoir and forcing a quantity of droplet medium out of the nozzle to form a droplet.

The apparatus may further comprise an optical sensor to detect the ejection of a droplet from the nozzle in order to provide control over the number and frequency of dispensed droplets.

Preferably, the air pump is a diaphragm pump. For example, a Clark Solutions KPM-12A pump may be used. More preferably, a microblower such as a Murata piezoelectric microblower MZB1001T02 may be used, providing for easier mounting on the dispensing element due to its lightweight properties. Additionally, a microblower is more readily actated in small increments offering good control over droplet volume. In contrast, a diaphragm pump may be mounted elsewhere and connected to the dispensing element by appropriate tubing.

In preferred embodiments, the dispensing element is a nozzle comprising a valve. The valve may reduce or prevent passive dripping of liquid from the nozzle under hydrostatic pressure. For example, a duckbill valve or cross-cut valve may be used. Alternatively or additionally, hydrostatic pressure at the nozzle may be reduced by reducing the vertical height of the reservoir and/or increasing the lateral width of the reservoir. The prevention of passive dripping may be more important for low viscosity liquids or larger aperture nozzles.

In some embodiments, the air pump is connected to multiple dispensing elements, each dispensing element comprising a chamber for holding a reservoir of droplet medium and a nozzle for the ejection of droplets. The air pump may be connected to each element by separate lines of tubing. In some embodiments, each tubing line comprises an independently controllable valve to provide for selective sealing of individual tubes. In some embodiments, the valves are solenoid valves.

In this way, the apparatus is adapted to drive multiple dispensing elements using only one air pump, which is more efficient, lower in cost and more compact.

The air pump setup allows the apparatus to be cleaned more easily because only the reservoir and nozzle require cleaning. Alternatively, the reservoir and/or nozzle may be disposable, removing the need for cleaning entirely.

The air pump setup does not require priming and has no dead volume. A shorter and wider nozzle may be used which increases the flow-rate of the liquid, allowing faster assembly construction to be achieved.

Bath Heating System

A further aspect of the invention is an apparatus for containing a bulk medium, the apparatus being adapted to provide heating of the bulk medium, the apparatus comprising:
- a thermally-conducting vessel defining a base and a side wall, wherein an inner surface of the side wall is arranged obtusely, such as having an angle of greater than 90°, with respect to the base;
- a heating element in contact with an external surface of the side wall; and
- a bath adapted to be placed within the vessel, the bath comprising an outer surface corresponding in geometry with the inner surface of the thermally-conducting vessel.

The apparatus comprises a two-piece arrangement in which the bath fits snugly within the thermally-conducting vessel. Given that the side wall of the vessel is obtuse, there is intimate contact between the bath and the vessel, and this contact is increased when the bath contains a bulk medium. This allows the rate of heat transfer from the heating element to the bulk medium within the bath to be maximised.

In some embodiments the apparatus for containing a bulk medium is part of a droplet assembly forming apparatus.

A reference to "thermally-conducting" is a reference to a vessel material that is a good conductor of heat, such as a metal.

In some embodiments, the vessel and bath have an inverted truncated cone shape (frustoconical-like). In this way, the side walls of the vessel and the bath are continuous and the bases of the vessel and bath are circular.

In some embodiments, the heating element is a resistance wire through which an electrical current may be passed. The wire may be wound around the outer surface of the side wall of the vessel. The wire preferably covers a portion, preferably a large proportion of the outer surface of the side wall. The wire may alternatively, or in addition, cover a portion of the outer surface of the base of the vessel.

In some embodiments the apparatus further comprises a base unit defining a cavity in which the vessel is placed. Preferably the cavity geometry is matched with the geometry of the outer surface of the side wall of the vessel.

In alternative embodiments, the bulk medium in the bath may be heated by inductive heating or radiative heating.

In some embodiments, the temperature of the bulk medium may be controlled by feedback from a temperature sensor. In some embodiments, this may be a contact temperature sensor such as a thermocouple or thermistor. Alternatively, a non-contact sensor such as an infra-red sensor may be used. Preferably, an infra-red sensor is mounted such that its entire field of view is occupied by the exposed surface of the bulk medium in the bath. A non-contact sensor provides the advantage that cleaning of the sensor between assembly construction sessions is not necessary.

In this way, the temperature of the bulk medium may be maintained at an optimal temperature for an indefinite period.

Dispensing Process

In some embodiments of the methods according to the first or second aspects, ejection of bodies is performed by the following steps:
 (a) ejecting a first body from the dispensing element in a first position;
 (b) moving the dispensing element towards a second position and simultaneously pumping body medium which will form a second droplet;
 (c) optionally providing a time delay to allow the first body to settle; and
 (d) ejecting the second body at the second position.

Steps (b)-(d) are then optionally repeated to build up the assembly.

Preferably the bodies are droplets and the body medium is a droplet medium.

The optional step (c) may be necessary where first and second positions are relatively close to one another, for example within 1-5 droplet diameters of one another. However, step (c) may not be necessary where first and second positions are more distant than this because droplets will not interfere with the trajectories of one another.

The second droplet must only be ejected at the time of, or after, reaching the second position, to ensure dispensing of droplets accurately into the correct positions. To facilitate this, the pumping rate may be adjustable, i.e. the time between actuation of the pumping step and ejection of the droplet. Alternatively or additionally, the movement speed of the dispensing element may be adjusted. It is acceptable for the pumping time to be longer than the movement time, which would result in a short delay after arrival at the second location before droplet ejection. However it is not acceptable for pumping time to be shorter than movement time, as this would result in ejection of a droplet before the dispensing element has reached its proper position.

Preferably, the pumping time and the relocation time are selected such that the droplet is dispensed exactly as the dispensing element reaches the second position.

In this way, the assembly building process is much more time-efficient.

Multiple-Assembly Formation

In some embodiments, a plurality of assemblies are constructed sequentially or simultaneously within the same bulk medium. By depositing bodies relatively far from one another, the bodies have a negligible effect on the position of previously deposited bodies.

In some embodiments, a multiple-assembly formation process according to the invention comprises the following steps:
 (a) depositing at least a first body of a first assembly from a dispensing element at a first position into a bulk medium;
 (b) moving the dispensing element into a second position;
 (c) depositing at least a first body of a second assembly into the bulk medium;
 (d) moving the dispensing element into a third position;
 (e) depositing at least a second body of the first assembly into the bulk medium;
 (f) moving the dispensing element into a fourth position; and
 (g) depositing at least a second body of the second assembly into the bulk medium.

Preferably, the bodies are droplets.

The first and third positions, and the second and fourth positions are in suitable proximity to allow for the formation of the first and second assemblies respectively.

Steps (d)-(g) may then be repeated a predetermined number of times to deposit third, fourth, fifth . . . $n^{th}$ bodies in each assembly until both assemblies are completed.

It will be understood that this method is not limited to the simultaneous formation of two assemblies, but can be applied to form two, three, four or more assemblies simultaneously in the same bulk medium.

In the method above, reference is made to the deposition of a first body for the first assembly followed by a first body for the second assembly. The method also encompasses methods where a plurality of first bodies are deposited for the first assembly followed by a plurality of first bodies for the second assembly.

Methods for Isolating a Finished Assembly

A further aspect of the invention is a method of isolating an assembly from a bulk medium comprising:
  providing a bath comprising a perforated platform extending across at least a portion of the bath;
  adding bulk medium to the bath to a level which covers the perforated platform;
  building an assembly, as described herein, upon the perforated platform; and
  raising the perforated platform from the bulk medium, thereby to isolate the assembly from the bulk medium.

Preferably, the assembly is a droplet assembly.

Accordingly, it follows that the methods of preparing a droplet assembly as described herein, may include the step of preparing the assembly on a perforated platform.

In some embodiments, the perforated platform is a flat sieve.

As the platform is raised after construction of the assembly, bulk medium passes through the perforations such that the bulk medium remains in the bath and the assembly is removed from the bulk medium.

A further aspect of the invention is a method of isolating an assembly from a bulk medium comprising:
  providing a bath comprising a first compartment and a second compartment;
  adding bulk medium to a first compartment;
  building an assembly, as described herein, within the first compartment; and
  transferring at least part of the bulk medium from the first compartment into the second compartment, thereby to isolate the assembly from the bulk medium.

Preferably the assembly is a droplet assembly. Accordingly, it follows that the methods of preparing a droplet assembly as described herein, may include the step of preparing the assembly on a perforated platform.

In this way, the bulk medium is partially or fully removed from the first compartment but the assembly remains in the first compartment, no longer covered by bulk medium. This eliminates the need for interaction of the user with the bath, thereby reducing the risk that the bulk medium will become contaminated. The process is simplified.

For example, the first and second compartments are in fluid communication, and the bath comprises means for transferring bulk medium from the first compartment to the second compartment.

Methods of Preserving Assemblies

In some embodiments, finished assemblies are cooled and stored at reduced temperatures to preserve their properties. For example, an assembly may be refrigerated or frozen. For example an assembly may be cooled to 4° C. or less, 0° C. or less, or −20° C. or less.

In more preferred embodiments, finished assemblies are subjected to flash-freezing. This may be achieved using dry ice, liquid nitrogen or a cooling bath comprising dry ice or liquid nitrogen mixed with another liquid. The other liquid may be ethanol.

In this way, freezing is fast and liquid loss from the assembly is reduced and the initial structure is preserved after thawing. Additionally, slow freezing may cause large ice crystals to grow which may damage the membrane around droplets leading to unwanted coalescence of adjacent droplets or rupture of an outer wall of the assembly.

BRIEF DESCRIPTION OF THE DRAWINGS

Embodiments of the invention are described below with reference to the accompanying Figures, in which:

FIG. 17 (f)-(j) show accessible areas for different variations of the SCARA mechanism.

DETAILED DESCRIPTION

Direct-spherification and reverse-spherification processes are known to be useful in the production of single encapsulated droplets. In both techniques a reagent within the droplet and a reagent within a medium into which the droplet is dispensed react to spontaneously form a membrane, usually of calcium alginate. In spherification processes, the droplet contains an alginate solution and the bath contains a calcium solution. In reverse-spherification processes the droplet contains a calcium solution and the bath contains an alginate solution. In both processes, the drop can be removed from the bath intact after formation of the membrane. US 2013/0251862 A1 describes an automated reverse-spherification process for the production of single droplets.

Figure 1:
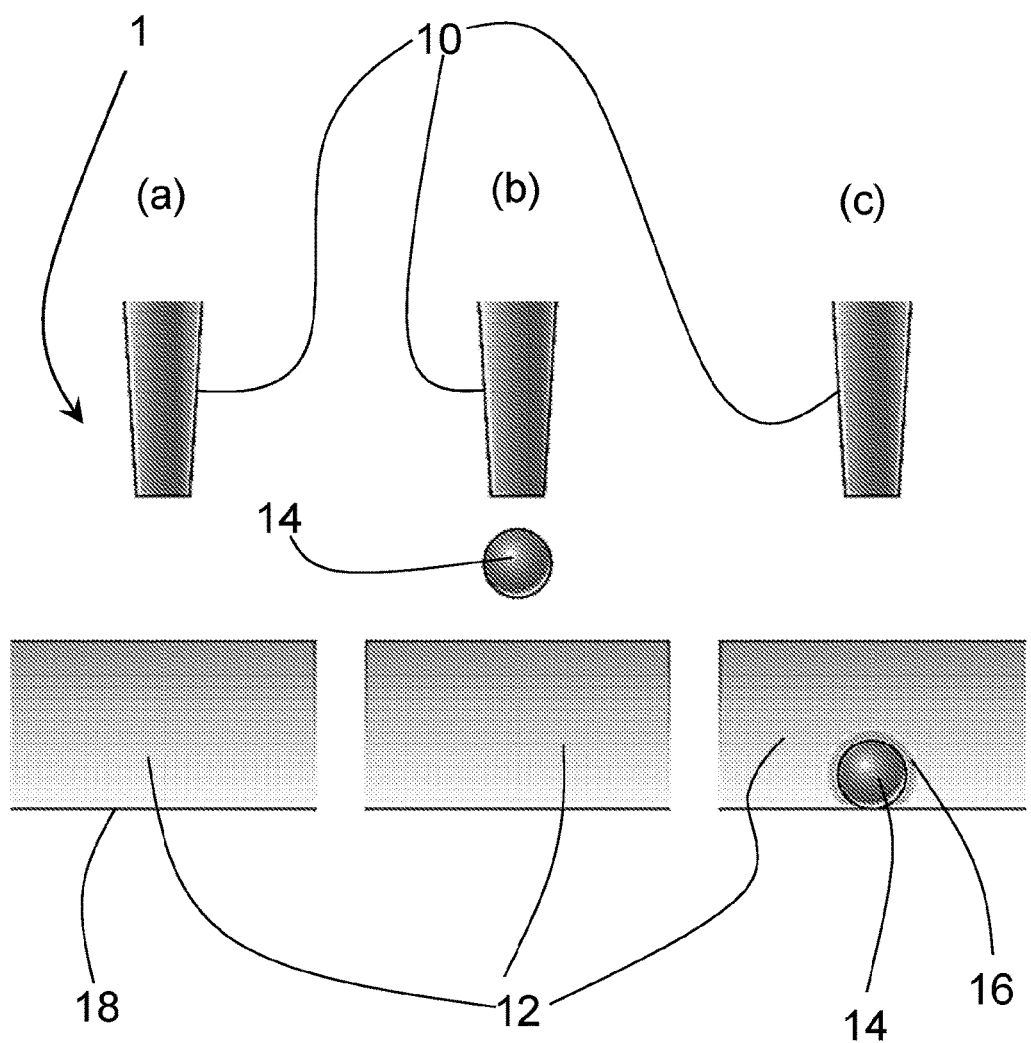
FIG. 1 shows schematic representations of an apparatus for use in a method according to an embodiment of the present invention.

FIG. 1 shows apparatus according to an embodiment of the fifth aspect of the invention, which is suitable for carrying out the method according to the first aspect of the invention. FIG. 1 shows three parts of a droplet formation process, (a), (b) and (c), corresponding to a single cycle of droplet formation. In (a) the apparatus is shown before droplet formation. In (b) the apparatus is shown immediately after droplet formation. In (c) the apparatus is shown after droplet deposition.

Apparatus 1 includes a dispensing element 10, for example a nozzle, which is positioned above the surface of a liquid bath 12 containing a bulk medium. Dispensing element 10 is connected to a peristaltic pump (not shown) which delivers discrete portions of liquid to the nozzle. Any other suitable pump may be used, such as a syringe pump. After the liquid is delivered to the nozzle, it is dispensed through a nozzle outlet in the form of a spherical droplet 14.

The droplet 14 consists of an aqueous solution of body reagent, for example calcium lactate. Other components may be present in the droplet such as thickening agents and/or density increasing agents. Flavouring agents may also be present.

The bath 12 contains an aqueous solution of bulk reagent, such as sodium alginate. Other components may be present in the bath such as thickening agents and/or density increasing agents.

The droplet 14 penetrates the upper surface of the bath 12 and sinks within the bath before coming to rest on the floor 18 of the bath. As soon as the droplet 14 makes contact with the liquid in the bath 12, a reaction is activated between the calcium lactate in the droplet 14 and the sodium alginate in the bath 12. A product of this reaction is calcium alginate, which forms a gel shell 16 as it is generated in the reaction, which encapsulates the droplet 14. The reaction continues until the available reagents are exhausted or the droplet is removed from the bath. The reaction proceeds via a reaction-diffusion process across the surface of the droplet 14. The shell growth rate becomes progressively slower with time.

Although not shown in FIG. 1, the apparatus also allows for a second droplet to be dispensed into a position adjacent to the first droplet to form a droplet assembly of controlled geometry.

Figure 2:
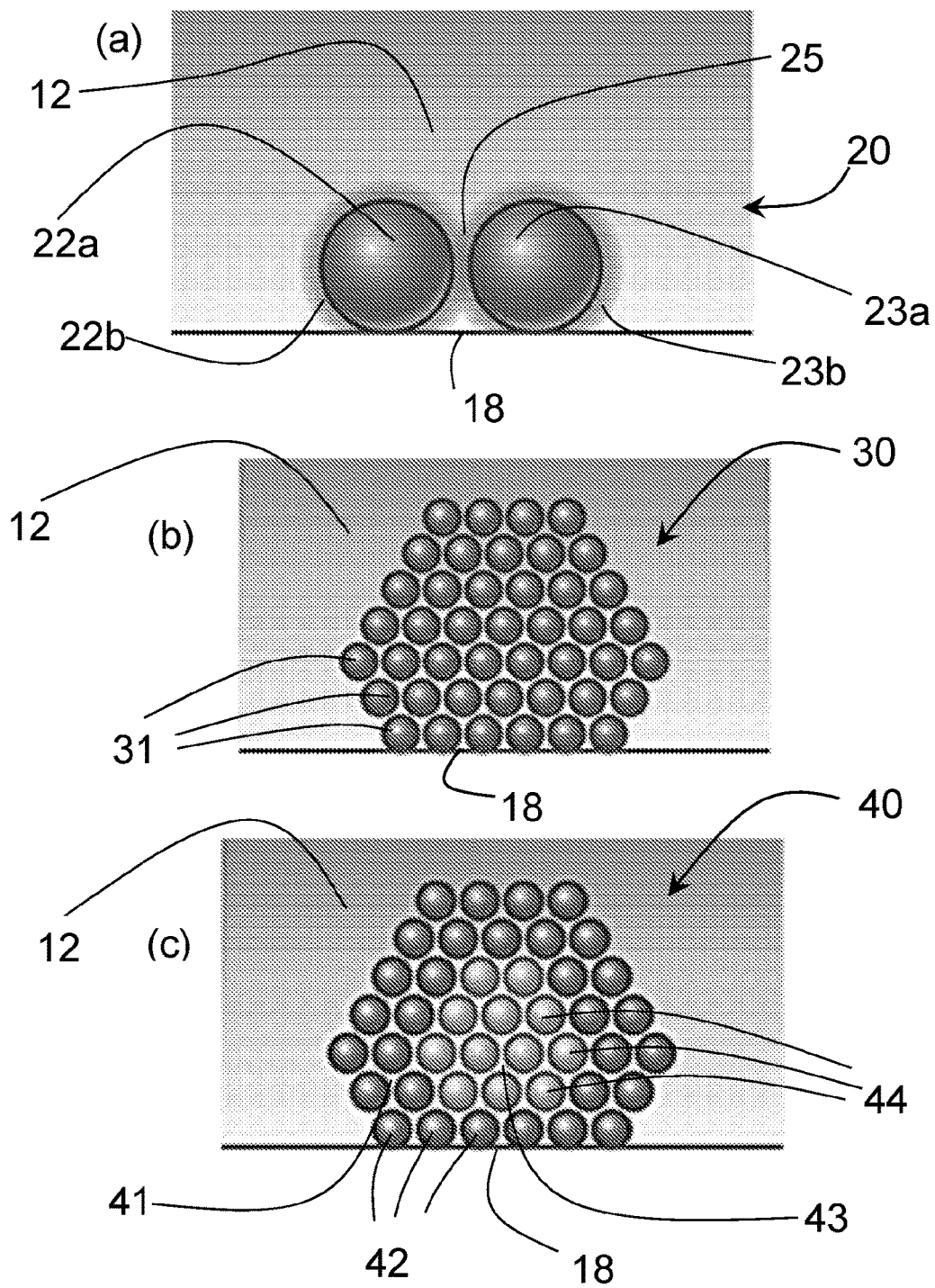
FIG. 2 shows schematic representations of assemblies according to an embodiment of the present invention.

FIG. 2(a) shows a one-dimensional assembly 20 consisting of two droplets 22a and 23a which have been dispensed to adjacent positions within the bath 12. The droplets may have been dispensed simultaneously by multiple dispensing elements (e.g. multiple nozzles), or may have been dispensed consecutively. As described above, each droplet upon contact with the bulk medium begins to develop a calcium alginate shell 22b, 23b. When the two droplets 22a, 23a are settled in position on the floor 18 of the bath, the shells propagate outwardly from each droplet towards the adjacent droplet, and after some time the shells 22b, 23b make contact within the region 25 between droplets. At this intermediate region 25 the two shells coalesce or integrate to become a single structure which binds the two droplets together by a gel phase. A stable assembly of droplets is thus formed. The assembly may be removed from the bath and further manipulated without jeopardising its structural integrity. For example, the assembly may be dried, dehydrated, coated or immersed in a further aqueous solution.

FIG. 2(b) shows a three-dimensional assembly 30 within a bath 12 consisting of seven horizontal planes of droplets 31 stacked on top of one another. The droplets 31 are the same in all respects as described above under FIG. 1 and FIG. 2(a). Each droplet 31 in the assembly is bound to one or more adjacent droplets by the integration of the calcium alginate gel capsules around each droplet. An assembly of multiple droplets 31 is thus formed, each droplet comprising a liquid medium encapsulated by a gel phase shell and each droplet bound to at least one adjacent droplet by the gel phase shell. The assembly may be removed from the bath and further manipulated without jeopardising its structural integrity. For example, the assembly may be dried, dehydrated, coated or immersed in a further aqueous solution, such as a calcium solution. The further aqueous solution may be the same as the body solution.

FIG. 2(c) shows a three-dimensional assembly 40 within a bath 12 consisting of seven horizontal planes of droplets stacked on top of one another. The assembly is similar to the assembly shown in FIG. 2(b), apart from the fact that the assembly in FIG. 2(c) includes two different types of droplet. A first type of droplet 44 is located in a central region 43 of the assembly, and a second type of droplet 42 is located in a peripheral region 41 which surrounds this central region.

The difference between the droplets in the region 43 and the region 41 may be the size of the droplets. Alternatively, there may be a difference in droplet composition. For example, the droplets in region 43 may comprise a higher concentration of solute than those in region 41. Alternatively, there may be a difference in droplet shape between the regions. Many other properties of the droplets which may differ will be apparent to the skilled person. It will also be clear that more than two different regions may be present in the assembly, for example the assembly may contain at least 3, 4 or 5 different regions, the droplets in each region having different properties from those in every other region.

Figure 3:
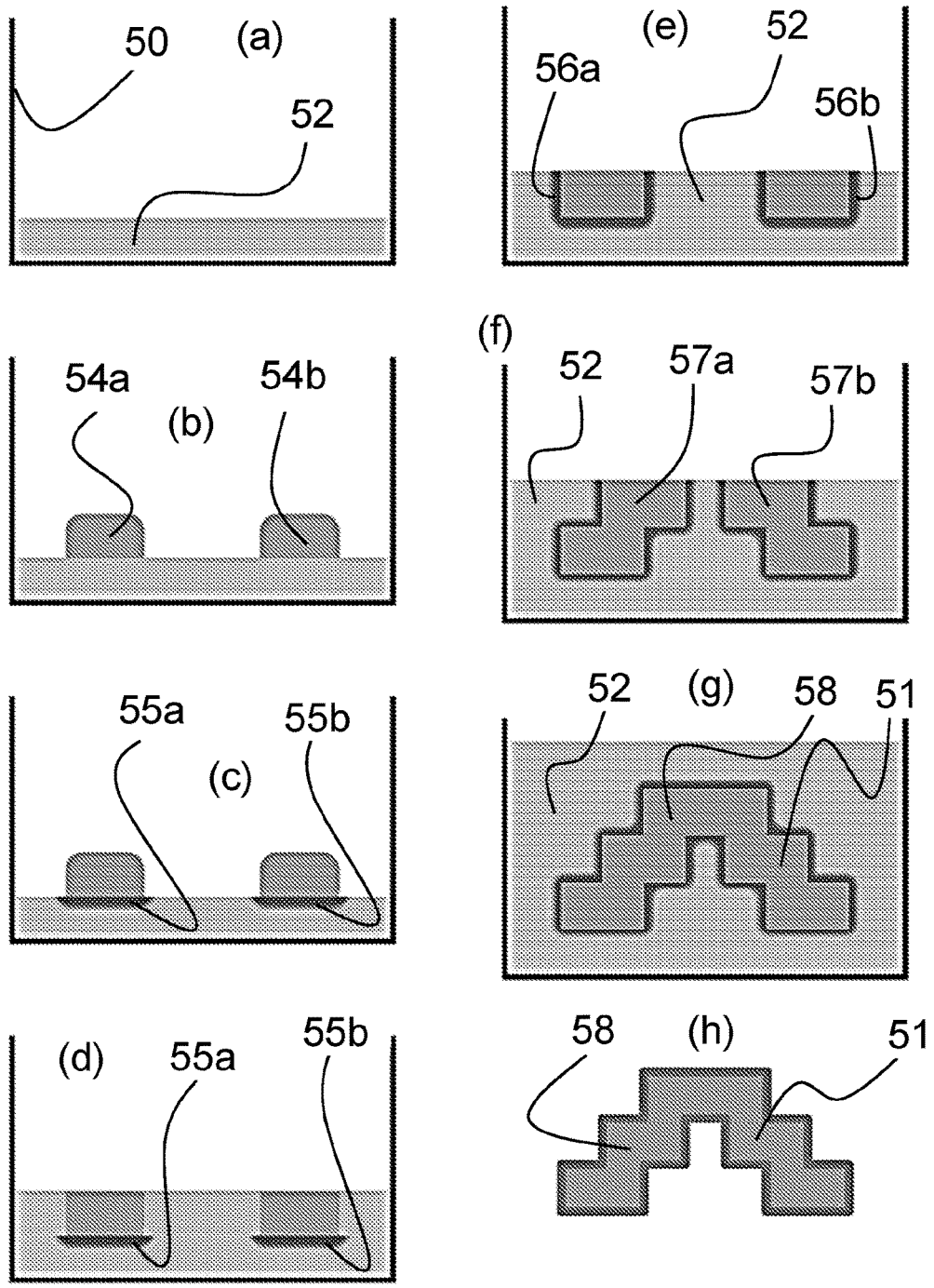
FIG. 3 shows a schematic representation of a method according to an embodiment of the second aspect of the invention.
Figure 4:
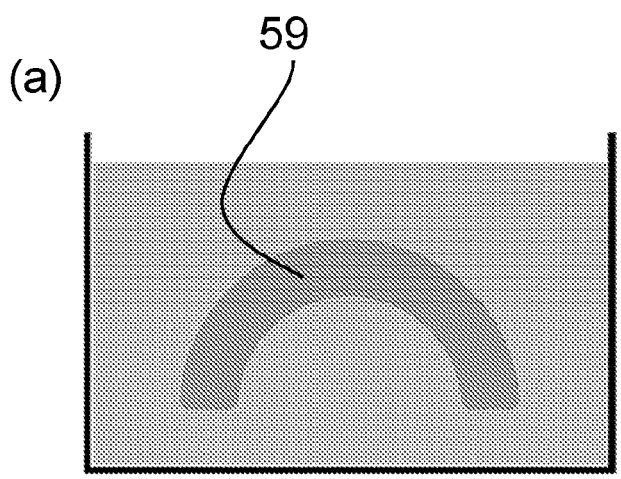
FIG. 4 shows a schematic representation of a method according to an embodiment of the second aspect of the invention.
Figure 4:
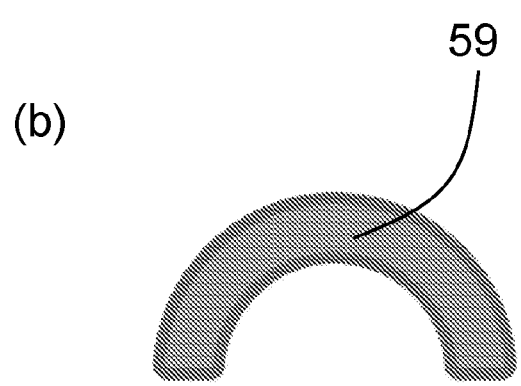

FIG. 3 shows an assembly construction method according to one embodiment of the present invention ((a)-(h)). FIG. 4 shows a similar method ((a)-(b)).

In FIGS. 3(a)-(h) the construction of an assembly comprising a plurality of droplets which combine to produce an uninterrupted region within the assembly is shown. First, a shallow layer of bulk medium is deposited to form a bath 52 within a container 50 (FIG. 3(a)). Individual droplets are deposited onto the bath 52 to form a first layer of bodies of droplet solution 54a and 54b, such that a portion of each droplet remains exposed above the surface of the bath.

Each droplet 54a and 54b contains calcium lactate, and the bulk medium contains a solution of sodium alginate. At the interface between each droplet 54a, 54b and the bulk medium 52, a reaction occurs between the calcium lactate and the sodium alginate in a reaction-diffusion process. A calcium alginate gel forms, which propagates outwardly from the interface as calcium ions migrate through the nascent gel shell and continue to react with alginate ions to thicken the shell from the outside. Since only a lower portion of each droplet surface is in contact with the bulk medium, the shell only partially encapsulates the droplets 54a and 54b.

In the next step as shown in FIG. 3(*d*), additional bulk medium is introduced into bath 52 to cover a greater portion (but still not the entirety) of the surfaces of droplets 54a and 54b. An upper surface of each droplet still remains exposed above the surface of the bath.

A gel shell then forms at the interface of the portions of the droplets newly covered with bulk medium (FIG. 3(*e*)).

In the step of the process shown in FIG. 3(*f*), a second layer of droplets consisting of droplets 57a and 57b is deposited upon the first layer. A portion of droplet 57a contacts the exposed portion of droplet 54a and a portion of droplet 57b contacts the exposed portion of droplet 54b. At this interface between droplets, a calcium alginate shell does not form and the droplet media will combine in the assembly. Additional bulk medium is then added to the bath after the second layer has been deposited, to cover all but an upper exposed portion of the second layer droplets, as shown in FIG. 3(*e*).

As shown in FIG. 3(*g*), a third layer is then deposited in a similar way to the second layer. In this embodiment, the assembly is to consist of three layers of droplets, so after deposition of this third layer bulk medium is added to the bath to completely cover the assembly 58 and complete the external shell. The assembly 58 may then be left to reside within the bath for a pre-determined period of time to achieve a desired thickness of outer calcium alginate shell. The assembly 58 may then be retrieved from the bath to obtain the assembly 58 shown in FIG. 3(*h*).

The resultant assembly consists of an external shell having a geometry defined by the order and position of deposited droplets, containing a continuous, uninterrupted internal medium 51 formed from the coalescence of media from the individually deposited droplets.

FIGS. 4(*a*) and (*b*) show an assembly formed by a variation of the process just described. The same process is performed but using the deposition of a much larger number of individual droplets, to create a "high-resolution" bow-shaped assembly 59. This demonstrates the versatility of the method in producing a wide range of assembly geometries. In particular, the method may produce assembly geometries that are self-supporting when completed, but not necessarily self-supporting during assembly construction, such as the assembly 59.

Figure 5:
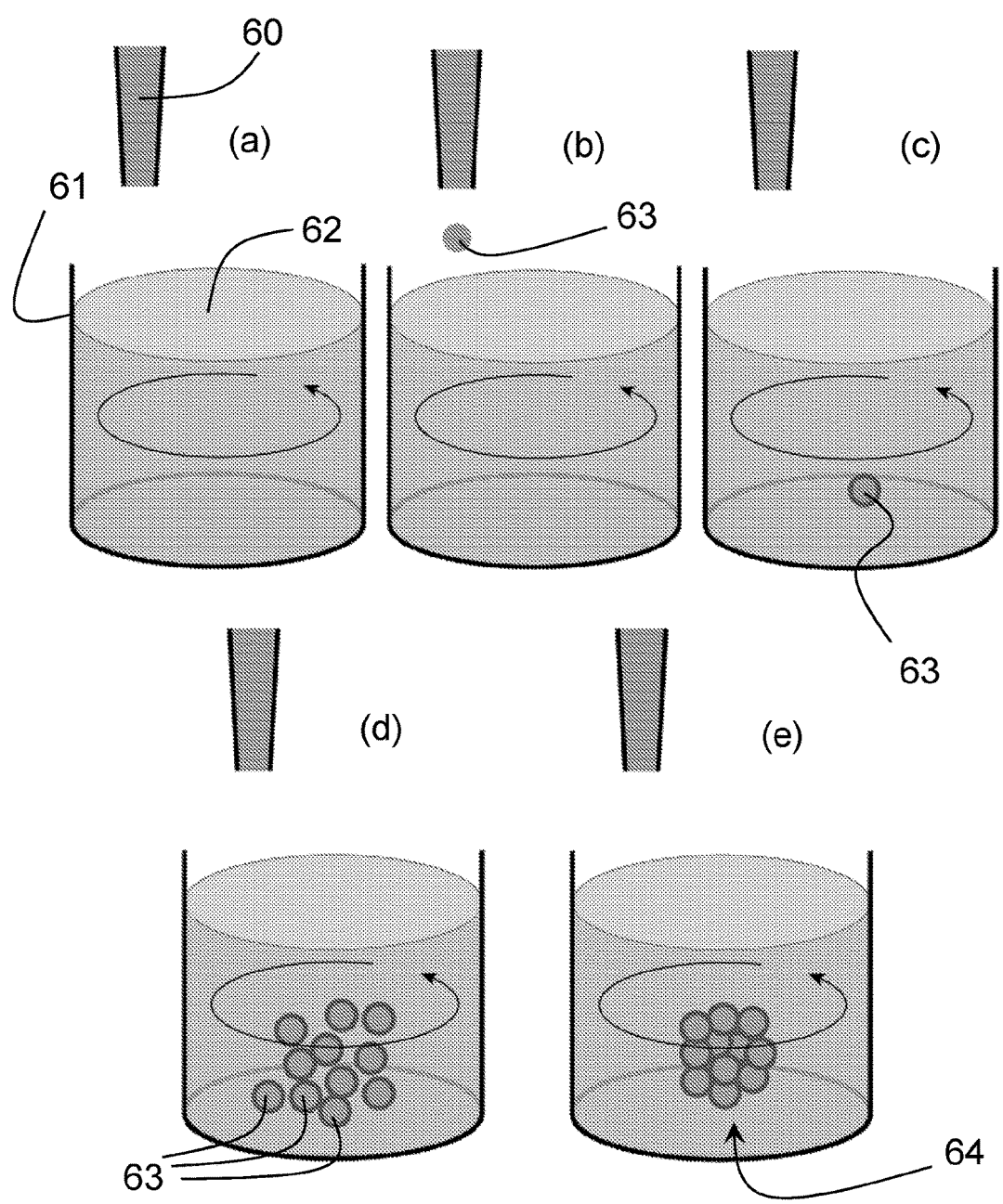
FIG. 5 shows a schematic representation of a method according to an embodiment of the third aspect of the invention.

FIG. 5 shows a method of assembly formation according to the present invention which uses the "tea leaf paradox" phenomenon to cause the aggregation of individual droplets into an assembly.

A dispensing element in the form of a nozzle 60 is located in a fixed position above a container 61 containing a bath of bulk medium 62. The nozzle dispenses droplets 63 into the bulk medium. Throughout the method, the bulk medium is stirred at a constant rate by e.g. rotation of the container which contains the bulk medium. Alternatively, a stirring element may be used within the container. In the embodiment shown, 11 droplets are dispensed into the bulk medium. However, there is no particular limit on the number of droplets which may be used to form an assembly by this method. For very small sized droplets, thousands or even millions of droplets may be dispensed into the bulk medium very quickly before aggregating under the stirring action.

As the liquid is stirred, droplets 63 within the bulk medium will naturally migrate to the centre and bottom of the container. This is because of the known "tea leaf paradox" phenomenon. As in the embodiments described above, gel capsule shells of calcium alginate begin to form around each droplet after it is immersed in the bulk medium. As droplets come in contact at the centre of the container, shell propagation continues and the shells of neighbouring droplets integrate with one another to form an assembly 64. After droplets are integrated the stirring may be terminated and the assembly can be removed from the bulk medium (or the bulk medium drained). This is a very efficient method for the formation of an assembly of droplets where the exact location of each droplet is not of great importance.

The assemblies described above are produced using a droplet solution of calcium lactate and a bulk solution of sodium alginate. However, many other reagents could be used as alternatives to these to produce the solid material capsules around the droplet. The Table below indicates some particularly useful combinations of reagents. Reagent 1 may be present in the droplet or the bulk medium. When reagent 1 is present in the droplet, reagent 2 is present in the bulk medium and vice versa.

| Type of reaction | Reagent 1 | Reagent 2 | Product (encapsulating material) |
|---|---|---|---|
| Ionic cross-linking of polymer | Barium or strontium ions | Alginate | Alginate gel |
| Ionic cross-linking of polymer | Borate or calcium ions | Guar gum | Guar gel |
| Ionic cross-linking of polymer | Phosphate ions | Chitosan | Chitosan gel |
| Ionic cross-linking of polymer | Potassium ions | Kappa carrageenan | Carrageenan gel (rigid) |
| Ionic cross-linking of polymer | Calcium ions | Iota carrageenan | Carrageenan gel (soft) |
| Ionic cross-linking of polymer | Calcium ions | Pectic acid | Pectic acid gel (soft or rigid) |
| Simple coacervation | Ethanol | Gelatine | Gelatine |
| Complex coacervation | Gum arabic | Gelatine | Gelatine |
| Complex coacervation | Xanthan gum | Gelatine | Gelatine |
| Complex coacervation | Gum arabic | Albumin | Albumin |
| Precipitation | Sodium dodecyl sulphate | Gelatine | Gelatine (solid) |
| Precipitation | Calcium salt | Carbonate salt | Calcium carbonate (solid) |
| Precipitation | Potassium iodide | Lead nitrate | Lead iodide (solid) |
| Precipitation | Sodium dodecylbenzene sulfonate | Gelatine | Gelatine gel |
| Condensation polymerisation | Formaldehyde | Urea | Urea-formaldehyde (solid) |
| Condensation polymerisation | Decanedioyl dichloride | Hexane-1,6-diamine | Nylon-6,10 (solid) |
| Condensation polymerisation | Hexanedioic acid | Hexane-1,6-diamine | Nylon-6,6 (solid) |

Figure 17:
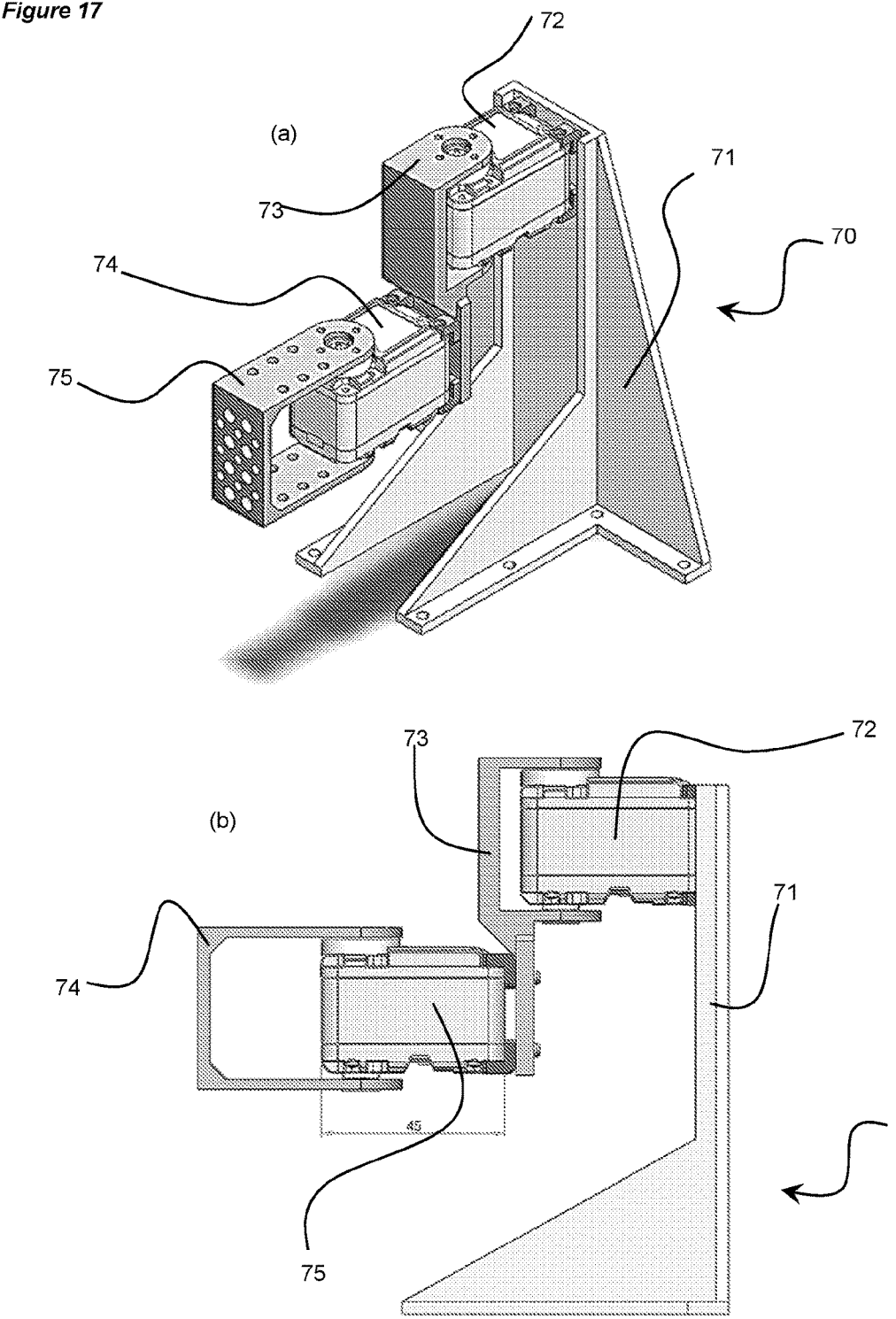
FIG. 17 shows a SCARA robot (a) in perspective view, (b) in side elevation, (c) in plan view of a first joint configuration, (d) in plan view of a second joint configuration, and (e) in plan view of a third joint configuration.
Figure 17:
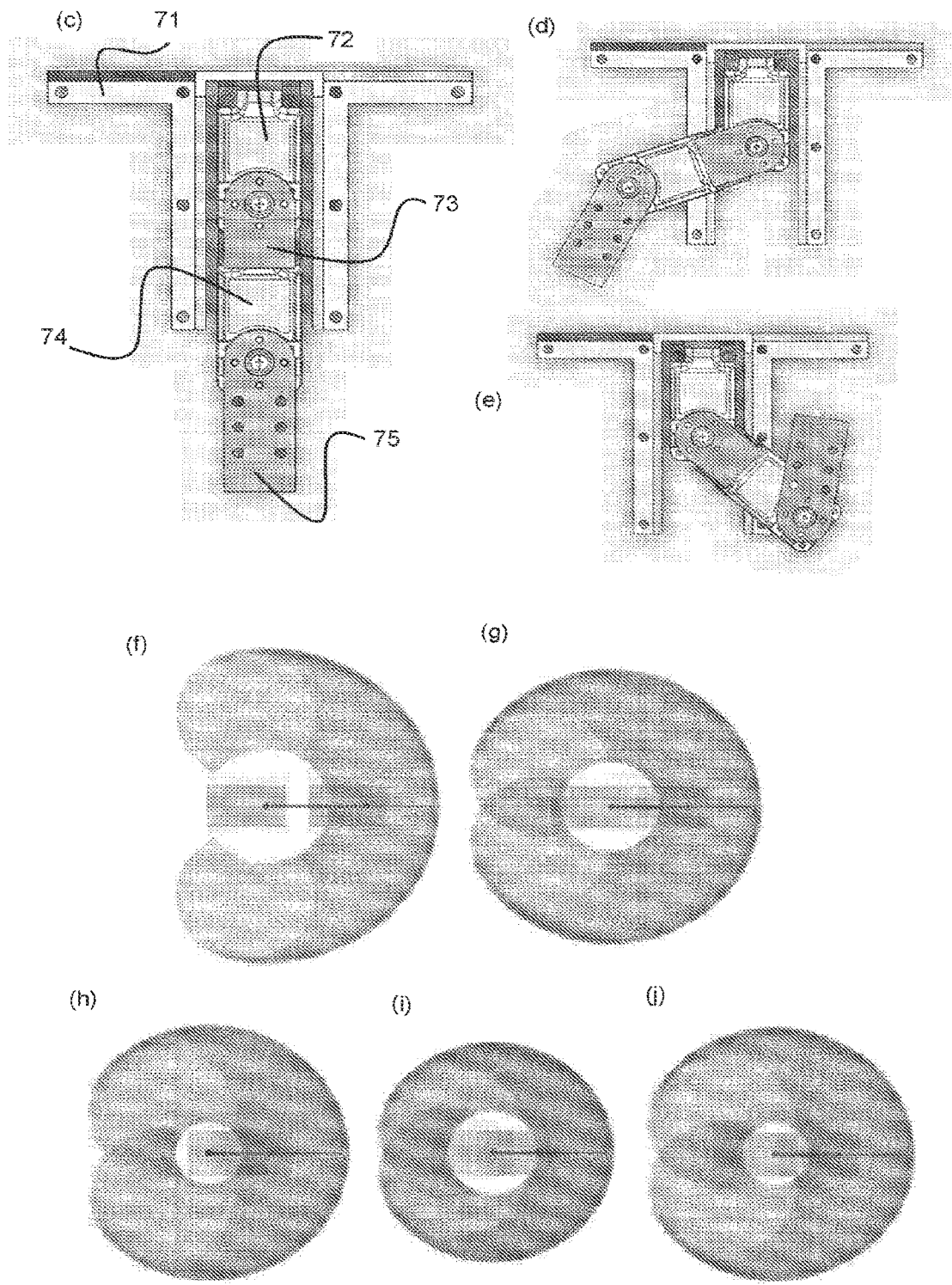

FIGS. 17 (*a*)-(*e*) show a SCARA robot 70 which may be used to control the movement of a dispensing nozzle during assembly formation. The SCARA mechanism 70 consists of a rigid fixed base 71 to which a first servo motor 72 is fixedly mounted. The first servo motor 72 is then connected by a rotatable joint to a first bracket 73. A second servo motor 74 is fixedly mounted to the first bracket 73 at a lower position than the first motor 72. A second bracket 75 connected to the second motor 74 by a rotatable joint completes the mechanism. The second bracket 75 includes a number of attachment points to which a dispensing nozzle may be attached.

FIGS. 17 (c)-(e) show the SCARA mechanism in plan view in three different configurations achieved by rotation of motors 72 and 74.

FIGS. 17 (f)-(j) show plan views of the accessible area of the SCARA mechanism arranged in different configurations. Servo motors 72 and 74 are visible as rectangles at the centre of each Figure, connected by brackets 73 and 75 represented by horizontal lines. In each of (f)-(j) a different length of bracket 73 is used resulting in different ranges of rotation and accessible areas for the dispensing nozzle. Dark grey areas can be reached by the nozzle in two configurations and light grey areas can be reached by the nozzle in one motor configuration.

Figure 18:
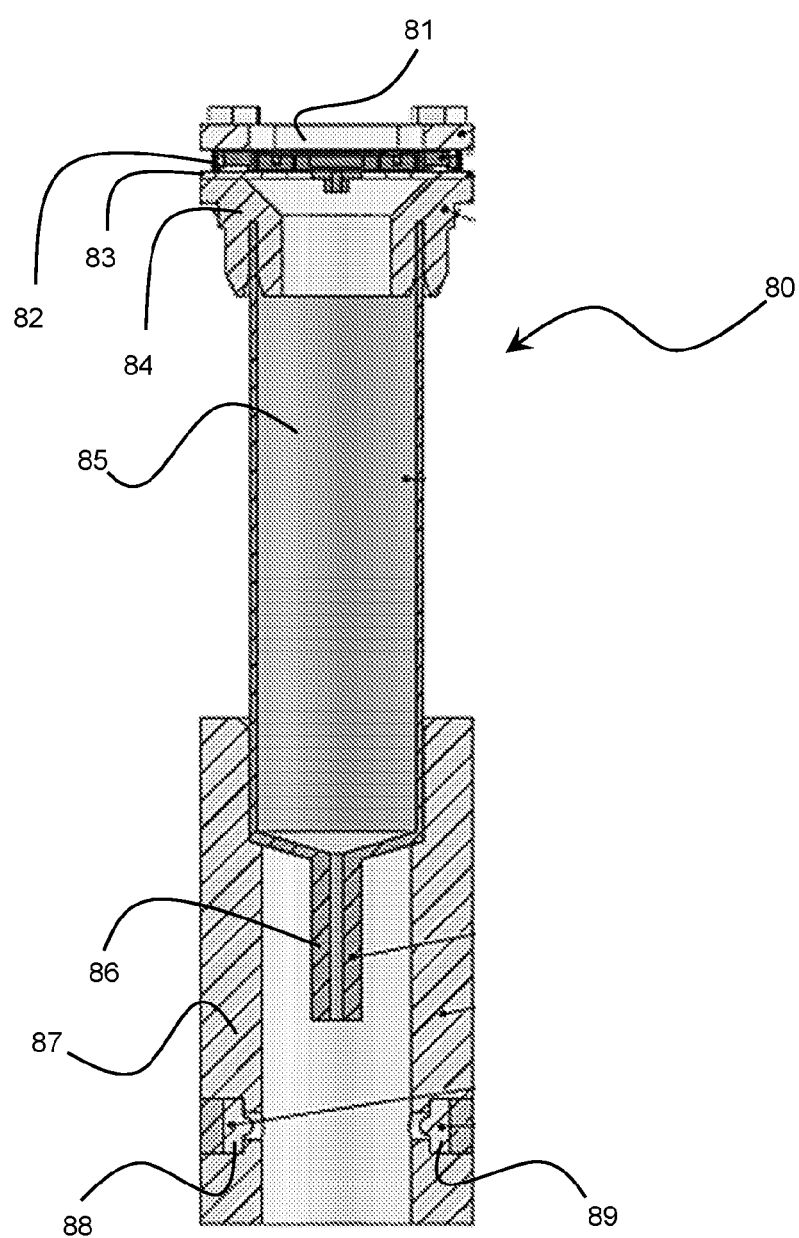
FIG. 18 shows a longitudinal cross-section through a dispensing system according to one embodiment of the invention.

FIG. 18 shows a dispensing apparatus 80 comprising a lid 81, a microblower 82, gasket 83 and microblower adapter 84. This unit is attached to the top of a reservoir 85 which can hold a volume of liquid. The reservoir 85 is in fluid communication with a nozzle 86. The reservoir is mounted in a sensor adapter 87 which includes a transmitter 88 and receiver 89 for detecting when a droplet is dispensed from the nozzle 86.

Figure 19:
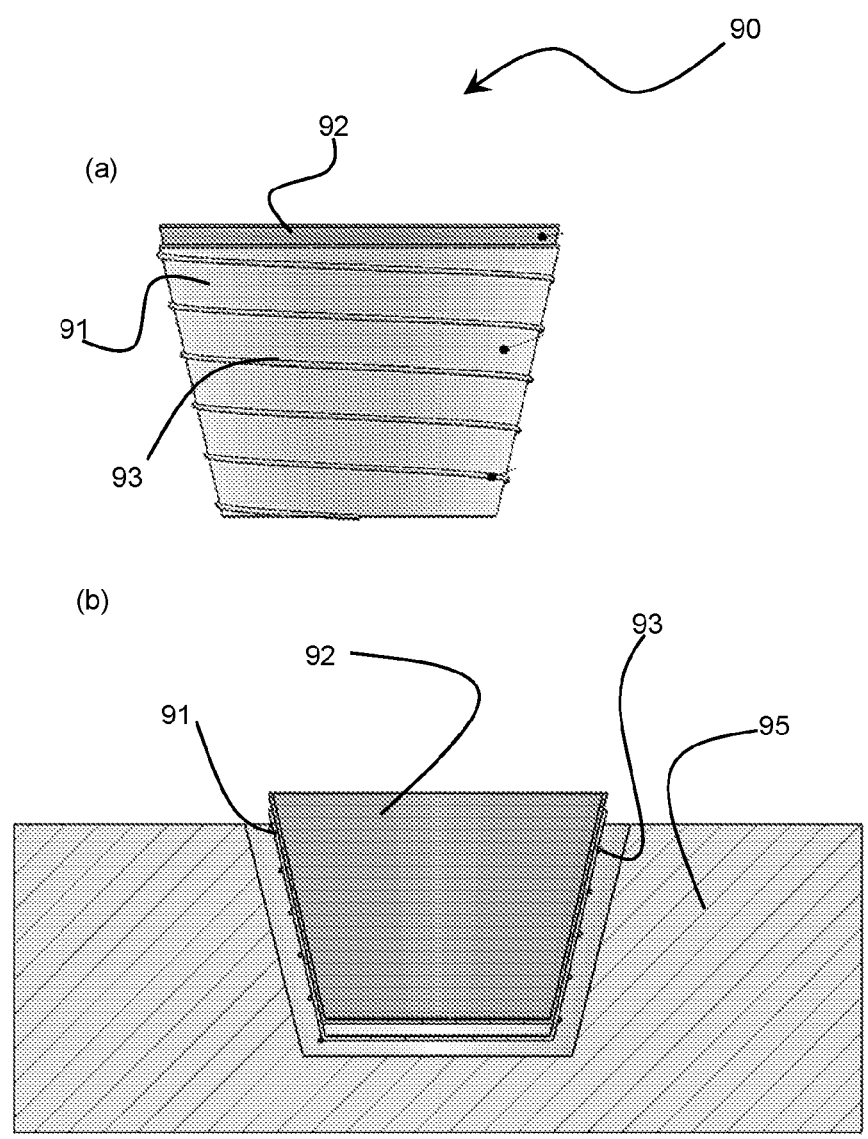
FIG. 19 shows heating apparatus according to one embodiment of the invention.

FIG. 19 (a) shows a heating system 90 for controlling the temperature of a water bath, or more specifically the bath of bulk medium according to the invention. The heating apparatus 90 comprises an outer metallic vessel 91 which has an inverted truncated cone shape. A heating element (resistance wire) 93 is wound around the outer surface of the vessel 91. A bath 92 is placed within the vessel 91. The outer shape of the bath 92 corresponds with the inner shape of the vessel 91. This provides a tight fit of the bath within the vessel. Furthermore, the truncated cone shape means that when the bath carries a load the bath is forced into more intimate contact with the vessel facilitating better heat transfer between the vessel and bath.

FIG. 19(b) shows the same heating system mounted in a base unit 95.

Figure 20:
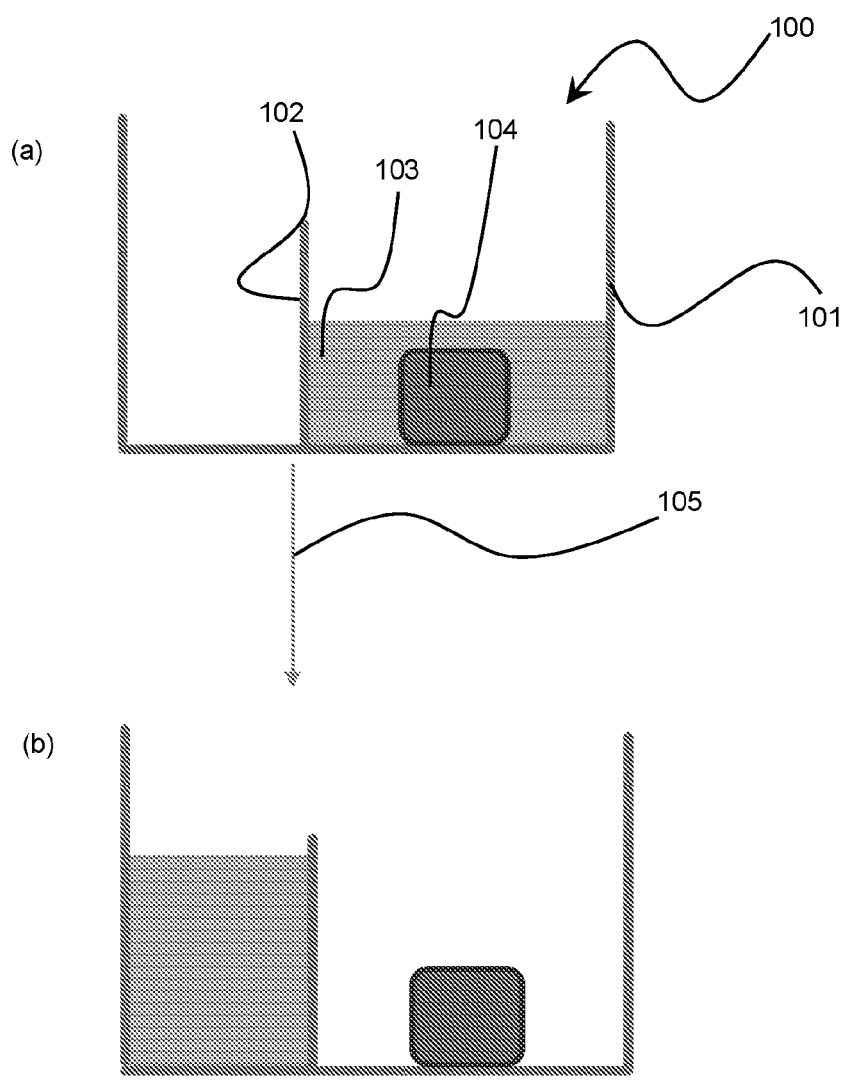
FIG. 20 shows a schematic representation of a bath according to one embodiment of the invention.

FIG. 20 shows a schematic cross-section of a droplet assembly forming apparatus 100 according to one embodiment of the invention. A bath 101 includes an inner partition wall 102 which extends across the inside of the bath 101 from one side wall to the opposite side wall. The partition wall therefore creates two separate chambers within the bath. One chamber contains bulk medium 103 into which droplets are deposited until an assembly 104 is formed. After completion of the assembly, the apparatus is rotated about a non-vertical axis (such as anticlockwise about an axis perpendicular with the page) until bulk medium flows out into the left-hand chamber. This process is shown by arrow 105 in FIG. 20. When the apparatus is then returned to its initial position as shown in FIG. 20(b), the assembly is isolated from the bulk medium without any intervention having been necessary.

EXAMPLES

Bath Compositions 1 g sodium alginate was dissolved in 200 mL distilled water to provide a bath composition B1 of 0.5% w/v solution of sodium alginate.

600 mg sodium alginate was dissolved in 200 mL distilled water to provide a bath composition B2 of 0.3% w/v solution of sodium alginate.

600 mg sodium alginate and 20 g sugar were dissolved in 200 mL distilled water to provide a bath composition B3 comprising a solution of 0.3% w/v sodium alginate and 10% w/v sucrose.

600 mg sodium alginate and 20 g maltodextrin were dissolved in 200 mL distilled water to provide a bath composition B4 comprising a solution of 0.3% w/v sodium alginate and 10% w/v maltodextrin.

500 mg sodium alginate was dissolved in 200 mL distilled water to provide a bath composition B5 comprising a solution of 0.25% w/v sodium alginate.

1 g sodium alginate and 4 mL food colouring was dissolved in 200 mL distilled water to provide a bath composition B6 of 0.5% w/v solution of sodium alginate and 2% v/v solution of food colouring.

250 mg sodium alginate was dissolved in 200 mL distilled water to provide a bath composition B7 comprising a solution of 0.125% w/v sodium alginate.

Droplet Compositions 2 g calcium lactate, 2 g xanthan gum and 30 g sugar were dissolved in 200 mL of distilled water to provide a droplet-forming solution D1 comprising 1% w/v calcium lactate, 1% w/v xanthan gum and 15% w/v sucrose.

2 g calcium lactate, 2 g xanthan gum and 100 mL Marks & Spencer® Apple and Mango High Juice were dissolved in 100 mL of distilled water to provide a droplet-forming solution D2 comprising 1% w/v calcium lactate, 1% w/v xanthan gum and 50% v/v High Juice.

2 g calcium lactate and 1 g xanthan gum were dissolved in 150 mL of distilled water, and 50 mL liquid honey of sugar content 80% w/v was then dissolved into that solution to provide a droplet-forming solution D3 comprising 1% w/v calcium lactate, 0.5% w/v xanthan gum and 25% v/v honey. Honey was added separately in a second step because the solids dissolve less readily in the presence of honey.

2 g calcium lactate, 0.4 g xanthan gum and 10 g sugar were dissolved in 200 mL of distilled water to provide a droplet-forming solution D4 comprising 1% w/v calcium lactate, 0.2% w/v xanthan gum and 5% w/v sucrose.

2 g calcium lactate and 10 g sugar were dissolved in 200 mL of distilled water to provide a droplet-forming solution D5 comprising 1% w/v calcium lactate and 5% w/v sucrose.

2 g calcium lactate, 2 g xanthan gum, 30 g sugar and 4 mL food colouring were dissolved in 196 mL of distilled water to provide a droplet-forming solution D6 comprising 1% w/v calcium lactate, 1% w/v xanthan gum, 15% w/v sucrose and 2% v/v food colouring.

2 g calcium lactate, 2 g xanthan gum, 30 g sugar and 20 mL yoghurt were dissolved in 180 mL of distilled water to provide a droplet-forming solution D7 comprising 1% w/v calcium lactate, 1% w/v xanthan gum, 15% w/v sucrose and 10% w/v yoghurt.

2 g calcium lactate, 34 g sugar and 4 mL food colouring were dissolved in 196 mL of distilled water to provide a droplet-forming solution D8 comprising 1% w/v calcium lactate, 17% w/v sucrose and 2% v/v food colouring.

1 g calcium lactate and 1 g xanthan gum were dissolved in 100 mL of Lithuanian blackcurrant wine to provide a droplet-forming solution D9 comprising 1% w/v calcium lactate and 1% w/v xanthan gum in Lithuanian blackcurrant wine.

2 g calcium lactate, 1 g xanthan gum and 10 g sugar were dissolved in 200 mL of distilled water to provide a droplet-forming solution D10 comprising 1% w/v calcium lactate, 0.5% xanthan gum and 5% w/v sucrose.

Droplet solutions were produced using both distilled water and tap water, however no perceptible difference in the obtained results was observed.

Preparation of Solutions

In the preparation of the above droplet-forming solutions, the action of mixing the solutes to cause them to dissolve introduced a high volume fraction of air bubbles that may preclude the successful formation of droplet assemblies. The bubbles could be successfully removed by centrifugation or vacuum degassing. In the case of centrifugation, the solution was dispensed into 2 mL tubes using a Pasteur pipette and the tubes were centrifuged at a relative centrifugal force of approximately 2,000 g using a Sprout® Mini-Centrifuge (Heathrow Scientific® LLC). In the case of vacuum degassing, the solution was subjected to an absolute pressure of approximately 5 Pa for 5 minutes. For highly viscous solutions or those that may have contained surfactants, for example those solutions that contained honey, it was necessary to then rapidly bring the solution to atmospheric pressure, and repeat the vacuum degassing process up to 10 times.

Example 1

Droplet-forming solution D1 was used in an attempt to produce assemblies comprising 48 droplets in a cubic lattice arrangement. The diameter of each droplet was approximately 3 mm. Where assembly formation was possible (e.g. where bath penetration was possible), the finished assemblies were left in the bath after construction for a period of 2 minutes to ensure adequate external shell formation to support the structure. Assemblies were removed from the bath using a spoon, and excess bath solution was soaked up by a paper towel. The assembly structures were evaluated by photographing the assemblies from multiple angles, including the crystal directions corresponding to the lattice structures. In the case of edible assemblies, their mouthfeels were also tested by ingestion.

Figure 6:
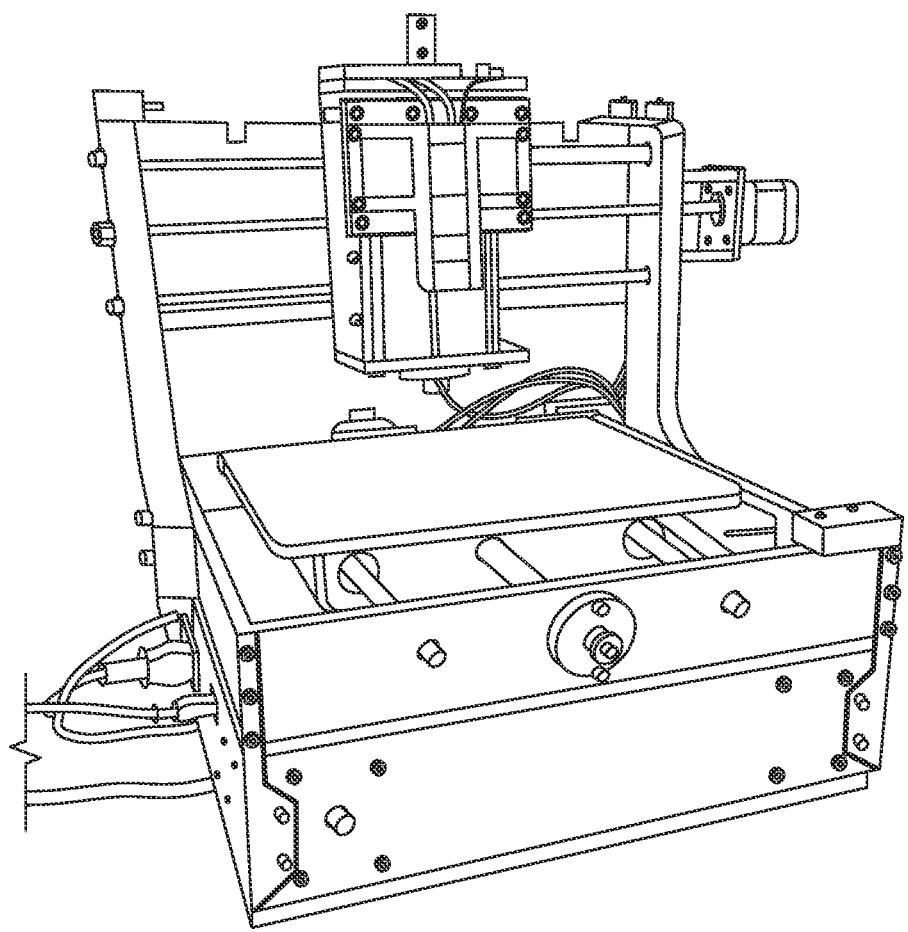
FIG. 6 shows a photograph of a dispensing device, for use in a method according to an embodiment of the invention, including a dispensing element and a Cartesian translation stage used to control the position of the deposition of bodies.

The droplet-forming solution was dispensed using a peristaltic pump and nozzle positioned 10 cm above the bath. The peristaltic tubing had an internal diameter of 1 mm and an external diameter of 3 mm. The nozzle consisted of a disposable 10 μL pipette tip fitted to the end of the peristaltic tubing. The depth of the bath solution was approximately 25 mm. The time interval between dispensing consecutive droplets was approximately 4 s. The movement of the nozzle relative to the bath was controlled by a Cartesian translation stage, according to instructions relayed from a computer to a microprocessor. The droplets were dispensed in consecutive layers, from the lowest to the highest. Within each layer, the droplets were dispensed in rows, in a left-to-right raster scanning pattern. The dispensing device is shown in FIG. 6.

Figure 7:
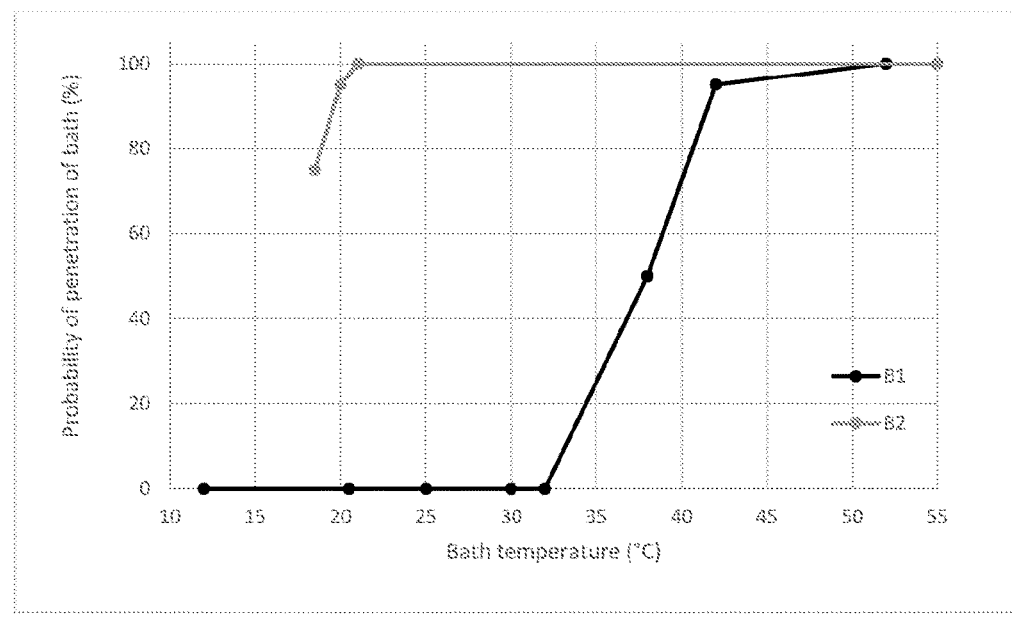
FIG. 7 shows a plot of the probability of bath penetration against bath temperature for two different bath compositions.

Bath temperatures were adjusted by heating the bath to a given temperature in a microwave oven, and allowing it to cool gradually while stirring the bath regularly and monitoring the temperature using a thermometer. Results are provided in Table 1 below and FIG. 7.

TABLE 1

Assembly Properties with Changes to Bath Composition and Temperature

| Bath Composition | Bath Temperature (° C.) | Approximate probability of penetration of bath (%) | Assembly Properties |
| --- | --- | --- | --- |
| B1 | 12 | 0 | No assembly |
|  | 20.5 | 0 | No assembly |
|  | 25 | 0 | No assembly |
|  | 30 | 0 | No assembly |
|  | 32 | 0 | No assembly |
|  | 38 | 50 | No assembly |
|  | 42 | 95 | Good print fidelity; gelatinous mouthfeel |

TABLE 1-continued

Assembly Properties with Changes to Bath Composition and Temperature

| Bath Composition | Bath Temperature (° C.) | Approximate probability of penetration of bath (%) | Assembly Properties |
| --- | --- | --- | --- |
|  | 52 | 100 | Acceptable print fidelity |
| B2 | 18.5 | 75 | No assembly |
|  | 20 | 95 | Acceptable print fidelity; juicy mouthfeel |
|  | 21 | 100 | Good print fidelity |
|  | 55 | 100 | Poor print fidelity |

These results show the effect of bath temperature on the ability of droplet-forming solution D1 to penetrate the surface of the bath. A higher temperature is required to reduce the bath viscosity to compensate for a higher concentration of alginate in the bath. Excessively high temperatures further reduce the bath viscosity, which causes droplets to sink too rapidly relative to the rate of capsule integration, so that droplets tend to roll down the assembly before integrating, instead of integrating at their intended positions in the assembly.

Example 2

Droplet-forming solution D3 was used in an attempt to produce assemblies in bath solution B2 in exactly the same way as described under Example 1. Droplets penetrated the bath with a probability of approximately 100% and good printing fidelity was attained at a bath temperature of 21° C. and 27° C.

Example 3

Droplet-forming solution D6 was used in an attempt to produce assemblies in bath solution B1 in exactly the same way as described under Example 1 at room temperature.

One assembly was removed from the bath immediately upon integration of the final droplet into the assembly. When the assembly was removed from the bath, it was noted that individual droplets on the periphery of the assembly were clearly distinct and protruded significantly from the assembly. The assembly was ingested, and it was noted that the encapsulating gel membranes had a soft mouthfeel.

Another assembly was removed from the bath approximately 15 minutes after integration of the final droplet into the assembly. When the assembly was removed from the bath, it was noted that the outer encapsulating gel had become significantly thicker than that in the first assembly, such that the assembly had a smoother appearance, and it was more difficult to distinguish individual droplets on the periphery of the assembly. The assembly was ingested, and it was noted that the encapsulating gel membranes had a substantial and gelatinous mouthfeel.

Example 4

Droplet-forming solution D6 was used in an attempt to produce assemblies in bath solution B1 in exactly the same way as described under Example 1 at room temperature. The depth of the bath solution was approximately equal to the height of the intended structure of the assembly. However, it was found that droplets on the uppermost layer of the assembly had not become fully immersed in the bath, so that these droplets did not become fully encapsulated, and therefore their droplet solution was exposed to air. It was concluded that it is necessary to print in an excess depth of bath solution to allow the uppermost droplets in an assembly to become completely encapsulated.

Example 5

Droplet-forming solution D6 was used in an attempt to produce assemblies in bath solution B1 in exactly the same way as described under Example 1 at room temperature, except that the time interval between dispensing consecutive droplets was 1 s. The reduced time interval between droplets caused each droplet to sink in the bath while the previously dispensed droplet was also sinking. Typically, consecutive droplets were dispensed in adjacent positions. A droplet therefore typically sank closely adjacent to another droplet that was also sinking. Such a pair of droplets interacted while sinking such that one or both of them settled in a position other than that intended.

Example 6

Droplet-forming solution D6 was used in an attempt to produce assemblies in bath solution B1 in exactly the same way as described under Example 1 at room temperature, except to produce a one-dimensional assembly of 10 droplets in a linear arrangement. Droplets penetrated the bath with a probability of approximately 100% and good printing fidelity was attained at room temperature.

Example 7

Figure 8:
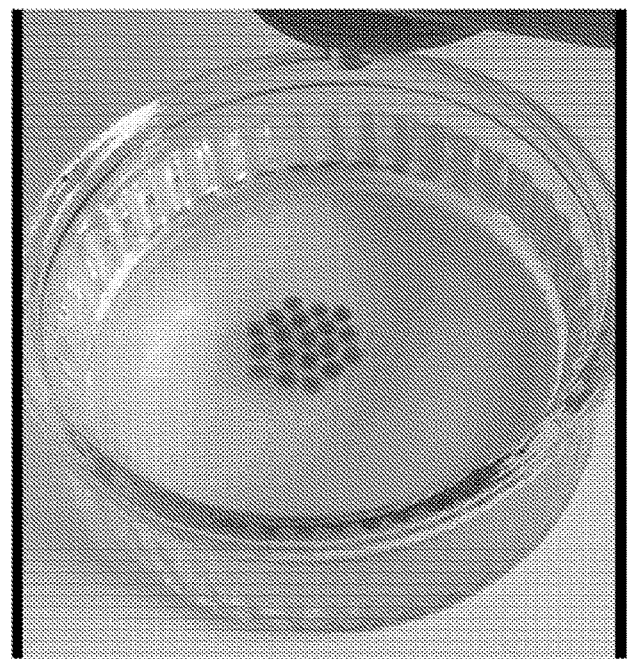
FIG. 8 shows a photograph of a two-dimensional assembly formed by a method according to an embodiment of the present invention.

Droplet-forming solution D6 was used in an attempt to produce assemblies in bath solution B1 in exactly the same way as described under Example 1 at room temperature, except to produce a two-dimensional assembly of 19 droplets in a hexagonal close-packed arrangement. Droplets penetrated the bath with a probability of approximately 100% and good printing fidelity was attained at room temperature. The constructed assembly within the bath is depicted in FIG. 8.

Example 8

Figure 9:
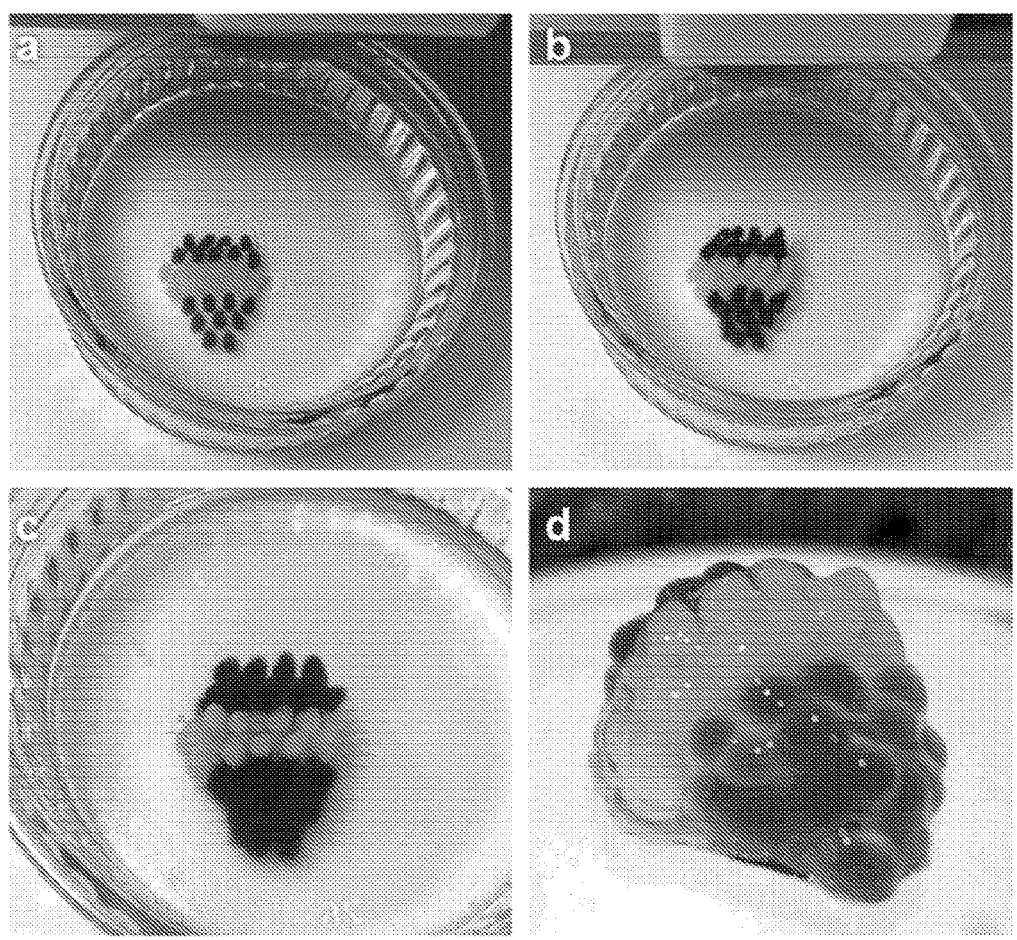
FIG. 9 shows photographs of a three-dimensional assembly at multiple stages during the method of its production according to an embodiment of the present invention.

Droplet-forming solutions D6 and D7 were used in an attempt to produce assemblies in bath solution B1 in exactly the same way as described under Example 1 at room temperature, except to produce an assembly of approximately 100 droplets in an arrangement of vertically stacked layers, and a separate pump, length of tubing and nozzle were used for each droplet-forming solution. The two nozzles were in fixed positions relative to each other, and separated laterally by 8 mm. Each layer was comprised of droplets in a hexagonal close-packed arrangement. The arrangement was such that droplets of solution D7 formed a band across a shape otherwise comprised of droplets of solution D6, and such that the overall assembly resembled the shape of a strawberry. The assembly in consecutive stages of construction and in the final state is depicted in FIG. 9 (a)-(d).

Example 9

Figure 10:
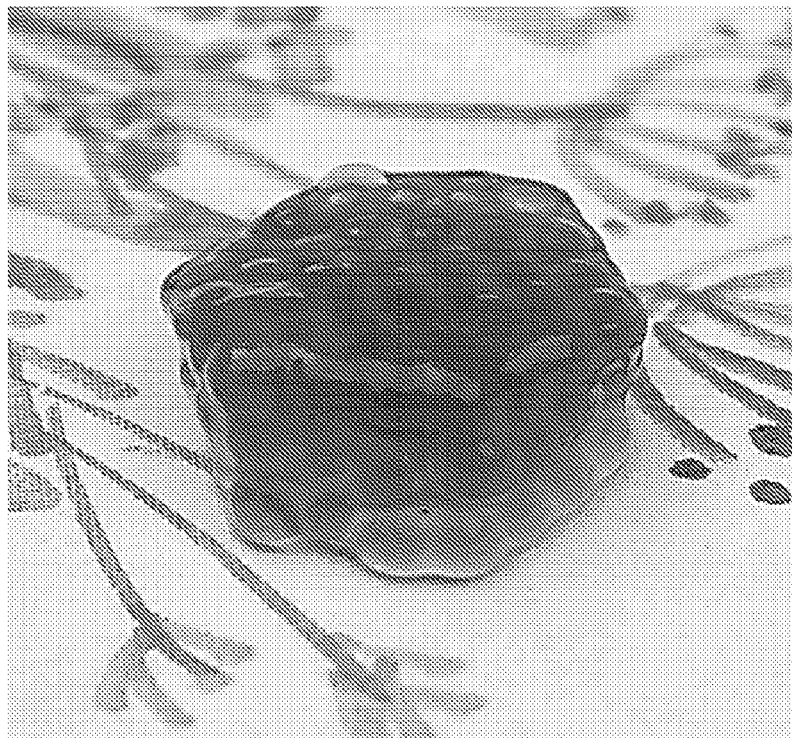
FIG. 10 shows a photograph of a three-dimensional assembly produced by a method according to an embodiment of the present invention.

Droplet-forming solution D6 was used in an attempt to produce assemblies in bath solution B1 in exactly the same way as described under Example 1 at room temperature, except to produce an assembly of 111 droplets in an arrangement of vertically stacked layers. Each layer was comprised of droplets in a hexagonal close-packed arrangement, with the outline of a hexagon, so that the entire assembly had the outline of a right hexagonal prism. The assembly is depicted in FIG. 10.

Example 10

Figure 11:
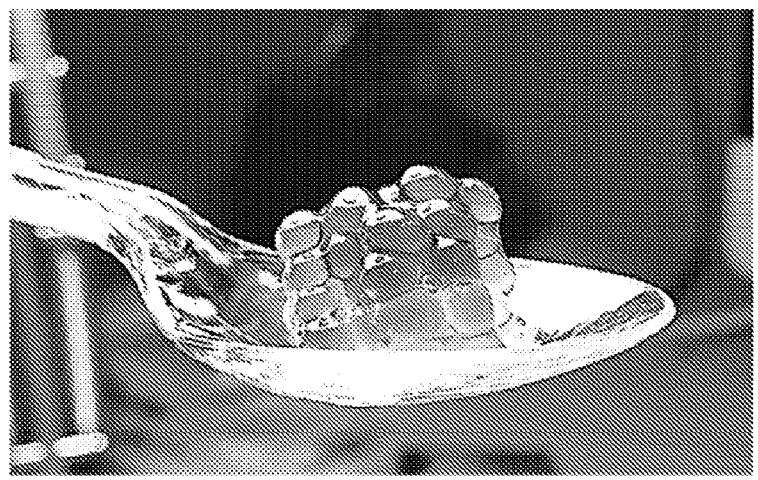
FIG. 11 shows a photograph of a three-dimensional assembly produced by a method according to an embodiment of the present invention.

To demonstrate the possibility of including species in the bulk medium that are not required for the formation of droplet assemblies, and to determine whether droplet assemblies could be made that included alcoholic beverages, droplet-forming solution D9 was used in an attempt to produce assemblies in bath solution B2 in exactly the same way as described under Example 1 at 28° C. Droplets penetrated the bath with a probability of approximately 100%, and the print fidelity was acceptable. The assembly, in which the droplets contain Lithuanian blackcurrant wine and the encapsulating gel contains food colouring, is shown in FIG. 11.

Example 11

To examine droplet formation with varying concentrations of alginate in the bath solution, droplet-forming solution D8 was used to make individual droplets in baths B7, B5 and B1 at room temperature. The droplets were dispensed using a Pasteur pipette from approximately 1 cm above the surface of the bath.

Figure 12:
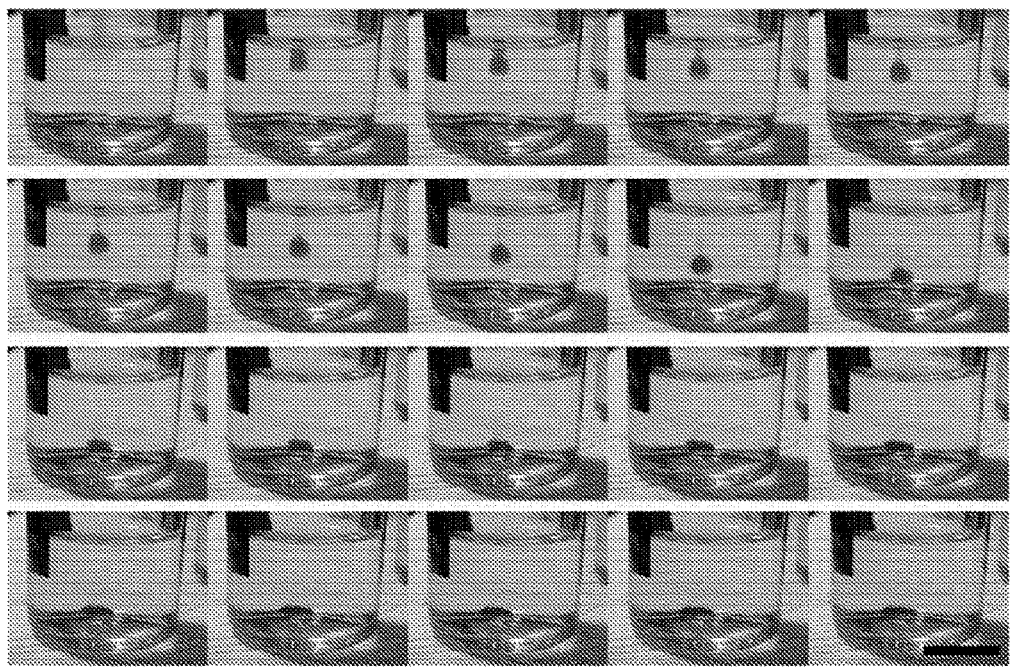
FIG. 12 shows a series of photographs showing the descent of a droplet through a bulk solution.

A typical result for bath B7 is shown in FIG. 12, which shows frames from a video of the experiment. The first frame shows the instant when the droplet first contacts the bath, and adjacent frames are separated by 149 ms. The scale bar represents approximately 15 mm. From this experiment it was concluded that a droplet of solution D8 made in bath B7 becomes encapsulated by a gel membrane that is too weak to support the weight of the droplet, and the droplet therefore flattens into a significantly oblate spheroid.

Figure 13:
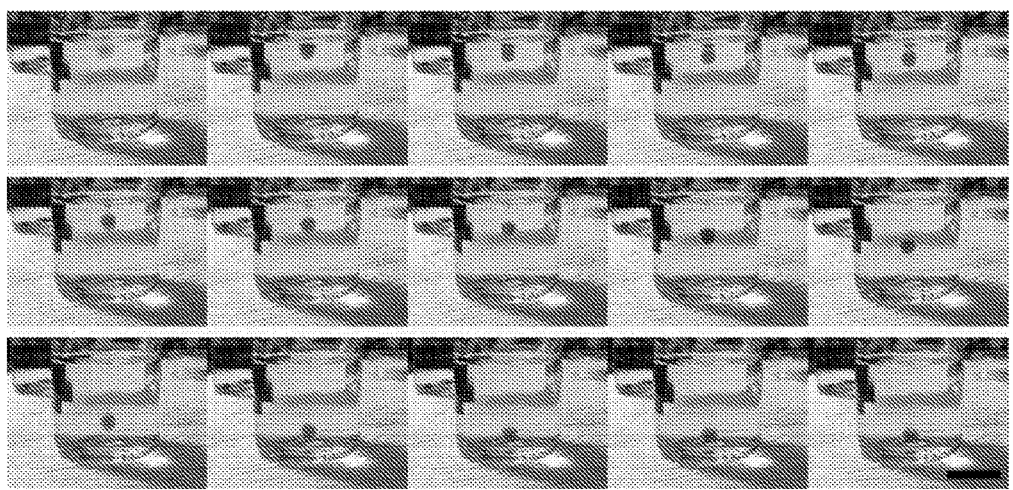
FIG. 13 shows a series of photographs showing the descent of a droplet through a bulk solution.

A typical result for bath B5 is shown in FIG. 13, which shows frames from a video of the experiment. The first frame shows the instant when the droplet first contacts the bath, and adjacent frames are separated by 300 ms. The scale bar represents approximately 15 mm. From this experiment it was concluded that a droplet of solution D8 made in bath solution B5 becomes encapsulated by a gel membrane that is strong enough to support the weight of the droplet, and the droplet therefore remains approximately spherical.

However, it was noted that the encapsulated droplet exhibited a long tendril that emerged from its trailing extreme.

Figure 14:
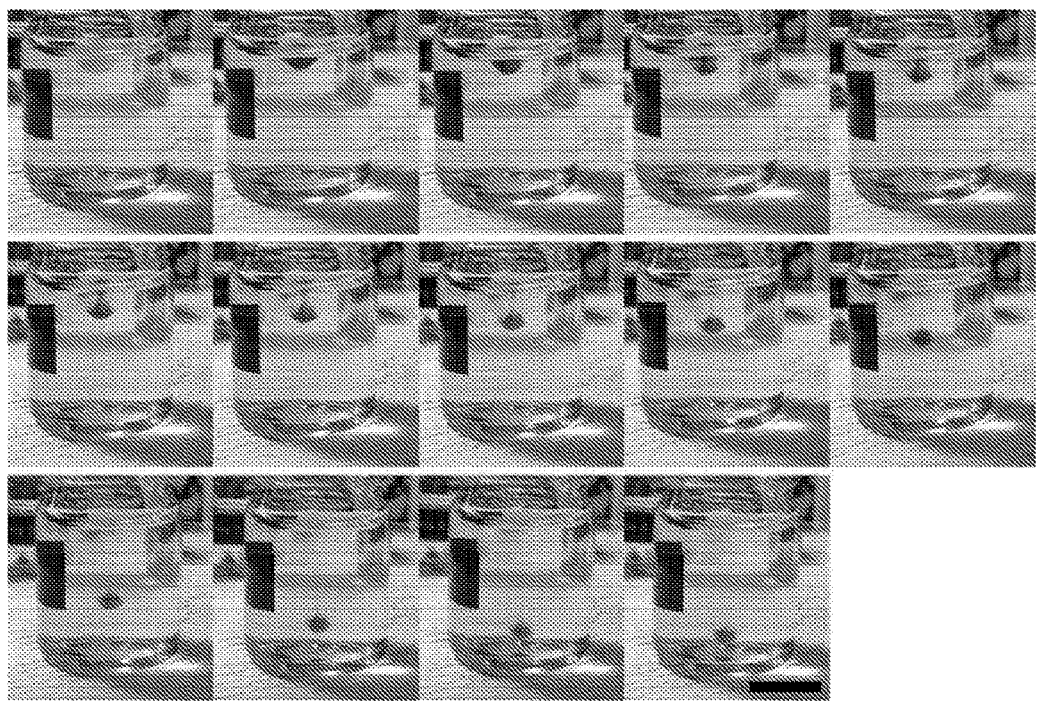
FIG. 14 shows a series of photographs showing the descent of a droplet through a bulk solution.

A typical result for bath B1 is shown in FIG. 14, which shows frames from a video of the experiment. The first frame shows the instant when the droplet first contacts the bath, and adjacent frames are separated by 1.499 s. The scale bar represents approximately 15 mm. It was noted that the droplet required several seconds to sink from the surface of the bath, and that it sank more slowly than the droplets made in bath solution B7 or B5. From this experiment it was also concluded that a droplet of solution D8 made in bath solution B1 becomes encapsulated by a gel membrane that is strong enough to support the weight of the droplet. However, the droplet was irregularly shaped, and it exhibited a long tendril that emerged from its trailing extreme.

From these three experiments, it was concluded that an alginate concentration greater than 0.125% w/v, such as 0.25% w/v or 0.5% w/v, was required for encapsulated droplets made from droplet-forming solution D8 to be self-supporting.

Example 12

To examine droplet formation with varying speed of droplets on impact with the bath solution, droplet-forming solution D8 was used to make individual droplets in bath B1 at room temperature. The droplets were dispensed from different heights so that they had different speeds upon impacting the surface of the bath solution.

In one experiment, a droplet was dispensed using a Pasteur pipette from 1 cm above the surface of the bath. The results of this experiment are detailed in FIG. 14 and the accompanying text in Example 11.

Figure 15:
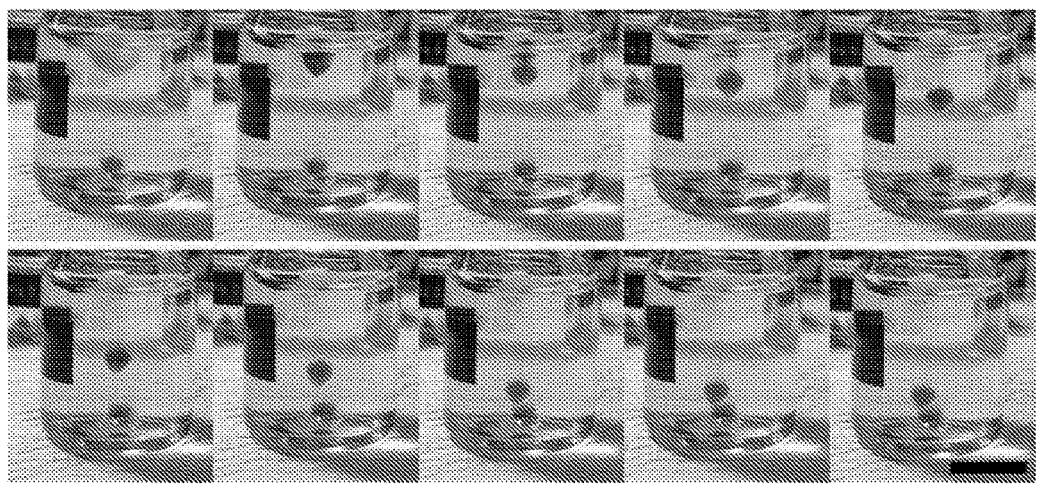
FIG. 15 shows a series of photographs showing the descent of a droplet through a bulk solution and its subsequent interaction with a second droplet.

In another experiment, a droplet was dispensed using a Pasteur pipette from 4.5 cm above the surface of the bath, which already contained the droplet that had been previously dispensed from 1 cm above the surface of the bath. The results are shown in FIG. 15, which shows frames from a video of the experiment. The first frame shows the instant when the droplet first contacts the bath, and adjacent frames are separated by 1.499 s. The scale bar represents approximately 15 mm. It was noted that the droplet dispensed from 4.5 cm above the bath solution differed from that dispensed from 1 cm above the bath solution as follows: the former had a more well-defined shape, it had a more pointed leading extreme and it sank into the bath more rapidly. After sinking through the bath, the droplet contacted the previous droplet, and the two droplets formed a stable assembly that remained upright. The second droplet was sinking at a rate of approximately 3.5 mm s$^{-1}$ when it contacted the previous droplet. This demonstrated that well-defined assemblies could in principle be constructed, and that these assemblies could have vertical or overhanging edges.

Example 13

To determine the effect of xanthan gum on the shape of encapsulated droplets, droplet-forming solutions D4 and D5 were each used to make individual droplets in a container of bath solution B5 at room temperature. Droplets were made in the same way as in Example 1. Each droplet formed from droplet solution D4 sank into the bath ~13 s after impacting the surface of the bath, and the encapsulated droplet had a short point on its trailing extreme. Each droplet formed from droplet solution D5 sank into the bath ~5 s after impacting the surface of the bath, and the encapsulated droplet comprised a tendril longer than one droplet diameter that extended from its trailing extreme. From this experiment it was concluded that the addition of xanthan gum to the droplet-forming solutions aided the achievement of a spherical or near-spherical shape of the encapsulated droplets.

Example 14

Droplet-forming solution D6 was used in an attempt to produce assemblies in bath solution B1 in exactly the same way as described under Example 1 at room temperature. To determine whether droplet assemblies could be stored in water, the constructed assembly was placed in a sealed vial of distilled water after being removed from the bath. The assembly was removed from the vial of distilled water after 24 hours. The assembly remained intact, and the only evident change was diffusion of the food colouring in the droplet solution into the vial of distilled water. The distilled water was therefore lightly coloured by the food colouring, and the droplets within the assembly were coloured less strongly than they were immediately after construction.

Example 15

Droplet-forming solution D6 was used in an attempt to produce assemblies in bath solution B1 in exactly the same way as described under Example 1 at room temperature. To determine whether droplet assemblies could be stored in oil, the constructed assembly was removed from the bath, excess bulk solution was removed using a paper towel, and the assembly was placed in a sealed vial of olive oil. The assembly remained substantially intact after 24 hours, but approximately 15% of the volume of the assembly had flowed out of the assembly, to form an aqueous phase collected on the periphery of the assembly.

Example 16

Figure 16:
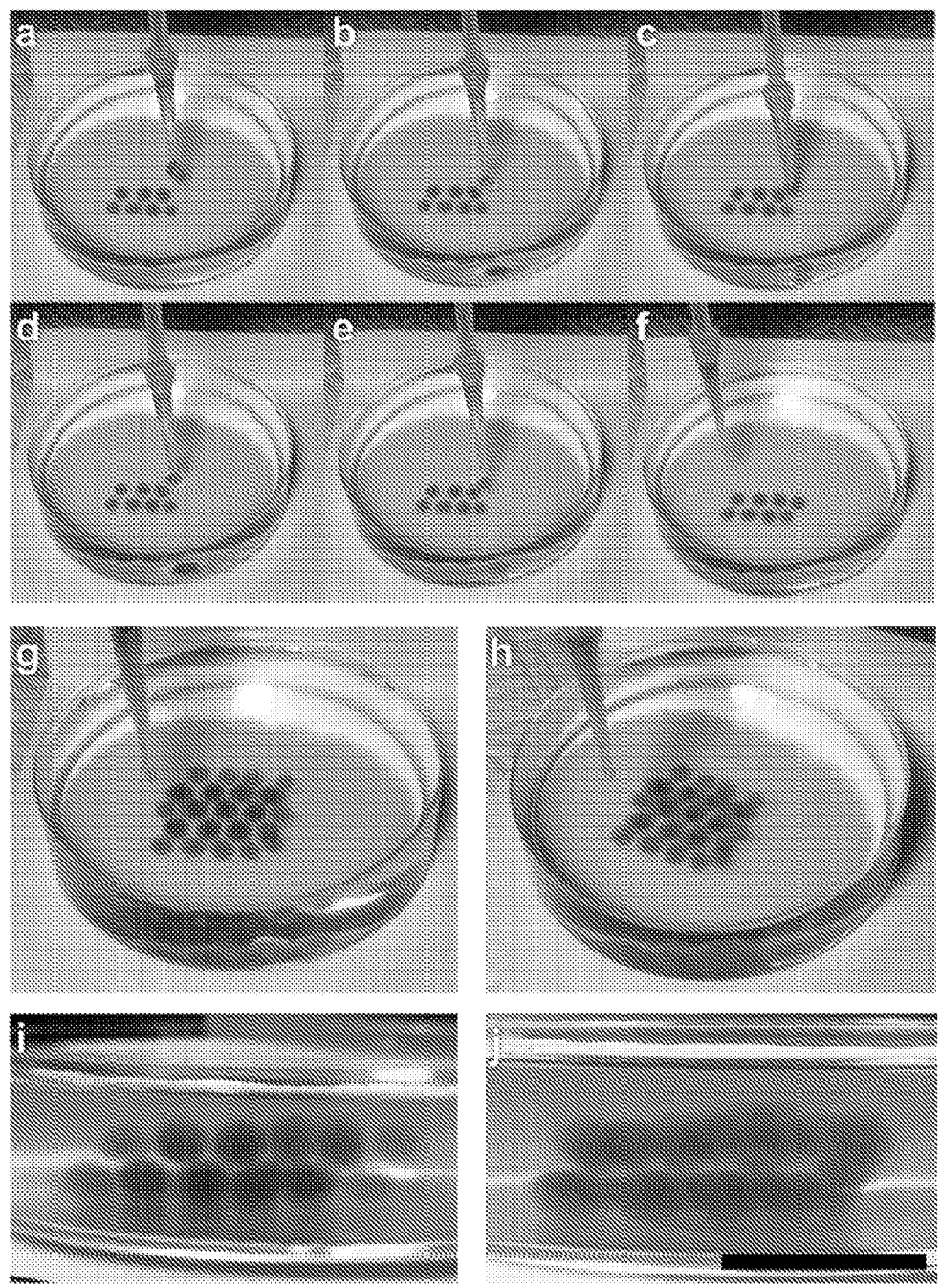
FIG. 16 shows a series of photographs depicting the production of a three-dimensional assembly of droplets by a method according to an embodiment of the present invention.

Droplet-forming solution D10 was used in an attempt to produce assemblies in bath solution B5 in exactly the same way as described under Example 1 at room temperature, except that 32 droplets were assembled in a two-layer, hexagonal close-packed structure, and the nozzle was used to immerse each droplet into the bath. The assembly construction process and constructed assembly are shown in FIG. 16.

The process in FIGS. 16(a)-(f) was as follows:
a. A pendant droplet is made to hang from the nozzle above the bath.
b. The nozzle is lowered so that the pendant droplet contacts the bath solution.
c. The nozzle is lowered further so that the pendant droplet is completely immersed in the bath solution.
d. The nozzle is raised so that the nozzle is removed from the bath solution.
e. The nozzle is further raised so that the pendant droplet detaches from the nozzle.
f. The previously pendant droplet is allowed to sink in the bath solution.

FIGS. 16(g)-(j) show the constructed two-layer assembly:
g. The assembly viewed along one of the crystal directions. Because of the precise packing of the droplets in a regular array, the two layers are difficult to distinguish when the assembly is viewed along a crystal direction.
h. The assembly viewed not along a crystal direction.
i. The assembly viewed horizontally along a different crystal direction.
j. The assembly viewed horizontally not along a crystal direction.

A variant of the above procedure was also tested in which steps (a) and (b) were replaced by the single step of releasing a droplet from the nozzle above the bath by pumping sufficient droplet-forming solution that the droplet detached under gravity, as in Example 1. However, after the first cycle of lowering the nozzle into the bath and then raising it to immerse the droplet, each subsequent droplet emerging from the nozzle tended to partially wet the outer surface of the nozzle. All droplets after the first therefore tended to require more solution to be pumped before they detached under gravity, and therefore droplet sizes were inconsistent. This problem could be addressed by immersing the nozzle in the bath prior to beginning assembly construction, or by cleaning the outer surface of the nozzle prior to the production of each droplet. The problem might also be avoided by the use of a different material on the outer surface of the nozzle, in particular a more hydrophobic material, such as polytetrafluoroethylene (PTFE).

The disclosure of all references cited herein, inasmuch as it may be used by those skilled in the art to carry out the invention, is hereby specifically incorporated herein by cross-reference.

The invention claimed is:

1. A method for preparing an assembly comprising a plurality of integrated capsules, the method comprising the steps of:
   (i) providing a first body comprising a first body reagent, wherein the first body reagent is, or is contained within, a first body medium;
   (ii) contacting the first body with a bulk medium comprising a bulk reagent, and permitting a first capsule shell to form at the boundary between the first body medium and the bulk medium, thereby forming a first capsule, wherein the bulk reagent has a larger molecular weight than the first body reagent, and wherein the first capsule shell comprises a product of a reaction involving the first body reagent and the bulk reagent, wherein the reaction involving the first body reagent may comprise ionic cross linking;
   (iii) providing a second body comprising a second body reagent, wherein the second body reagent is, or is contained within, a second body medium;
   (iv) contacting the second body with the bulk medium comprising the bulk reagent, and permitting a second capsule shell to form at the boundary between the second body medium and the bulk medium, thereby forming a second capsule, wherein the second capsule shell comprises a product of a reaction involving the second body reagent and the bulk reagent, wherein the reaction involving the second body reagent may comprise ionic cross linking; and
   (v) permitting the first and second capsule shells to integrate, thereby forming an assembly of first and second bodies,
   wherein the bulk medium is hydrophobic.

2. The method according to claim 1, wherein the first and second body media are aqueous media and/or wherein the bulk media are aqueous media.

3. The method according to claim 1, wherein the first and second capsule shells are formed in a reverse-spherification process.

4. The method according to claim 1, wherein both the first and second bodies are dispensed into a single bath holding the bulk medium.

5. The method according to claim 1, wherein each body reagent is dissolved in its respective body medium.

6. The method according to claim 1, wherein each body is dropped into the bulk medium.

7. The method according to claim 1, wherein the one of the bulk reagent and the body reagent is a polymer, wherein the polymer is or comprises a biopolymer, and wherein the biopolymer is a polysaccharide, especially alginate.

8. The method according to claim 1, wherein the first and second capsule shells are permitted to contact during the formation of the first or second capsule shell.

9. The method according to claim 1, wherein the period of time between the formation of the first and second capsules is up to 10 s.

10. The method according to claim 1, wherein each body is deposited by controlled deposition into a pre-determined position within a bath.

11. The method according to claim 1, wherein one or more of the body media and/or the bulk medium is adapted to facilitate penetration of one or more of the bodies into the bulk medium and to control the sinking rate of the one or more of the bodies within the bulk medium.

12. The method according to claim 1, wherein the bulk medium comprises lecithin.

13. A method for preparing an assembly comprising a plurality of integrated capsules, the method comprising the steps of:
   (i) providing a first body comprising a first body reagent, wherein the first body reagent is, or is contained within, a first body medium;
   (ii) contacting the first body with a bulk medium comprising a bulk reagent, and permitting a first capsule shell to form at the boundary between the first body medium and the bulk medium, thereby forming a first capsule, wherein the bulk reagent has a larger molecular weight than the first body reagent, and wherein the first capsule shell comprises a product of a reaction involving the first body reagent and the bulk reagent, wherein the reaction involving the first body reagent may comprise ionic cross linking;
   (iii) providing a second body comprising a second body reagent, wherein the second body reagent is, or is contained within, a second body medium;
   (iv) contacting the second body with the bulk medium comprising the bulk reagent, and permitting a second capsule shell to form at the boundary between the second body medium and the bulk medium, thereby forming a second capsule, wherein the second capsule shell comprises a product of a reaction involving the second body reagent and the bulk reagent, wherein the reaction involving the second body reagent may comprise ionic cross linking; and
   (v) permitting the first and second capsule shells to integrate, thereby forming an assembly of first and second bodies, wherein the bulk medium is a suspension.

14. The method according to claim 13, wherein the suspension is an emulsion.

15. The method according to claim 1, wherein the bulk medium is a foodstuff selected from the group consisting of fruit juice, honey, yogurt, an alcoholic beverage, tea, coffee, dressings, sauce, soup, and combinations thereof.

16. The method according to claim 1, wherein the bulk medium comprises nutritional supplements selected from the group consisting of vitamins, minerals, fiber, fatty acids, amino acids, polypeptides, and combinations thereof.

17. The method according to claim 1, wherein the bulk medium comprises cosmetic products selected from the group consisting of mouthwash, toothpaste, soap, cream, fragrance, and combinations thereof.

18. The method according to claim 1, wherein the bulk medium comprises plant extracts selected from the group consisting of fruits, seeds, leaves, stems, vegetable extracts, and combinations thereof.

19. A method for preparing an assembly comprising a plurality of integrated capsules, the method comprising the steps of:
   (i) providing a first body comprising a first body reagent, wherein the first body reagent is, or is contained within, a first body medium;
   (ii) contacting the first body with a bulk medium comprising a bulk reagent, and permitting a first capsule shell to form at the boundary between the first body medium and the bulk medium, thereby forming a first capsule, wherein the bulk reagent has a larger molecular weight than the first body reagent, and wherein the first capsule shell comprises a product of a reaction involving the first body reagent and the bulk reagent, wherein the reaction involving the first body reagent may comprise ionic cross linking;

(iii) providing a second body comprising a second body reagent, wherein the second body reagent is, or is contained within, a second body medium;

(iv) contacting the second body with the bulk medium comprising the bulk reagent, and permitting a second capsule shell to form at the boundary between the second body medium and the bulk medium, thereby forming a second capsule, wherein the second capsule shell comprises a product of a reaction involving the second body reagent and the bulk reagent, wherein the reaction involving the second body reagent may comprise ionic cross linking; and (v) permitting the first and second capsule shells to integrate, thereby forming an assembly of first and second bodies, wherein the first body medium and/or the second body medium is non-aqueous.

* * * * *